US012086593B2

(12) United States Patent
Smith

(10) Patent No.: US 12,086,593 B2
(45) Date of Patent: Sep. 10, 2024

(54) CAPABILITY-GENERATING ADDRESS CALCULATING INSTRUCTION

(71) Applicant: Arm Limited, Cambridge (GB)

(72) Inventor: Lee Douglas Smith, Cambridge (GB)

(73) Assignee: Arm Limited, Cambridge (GB)

( * ) Notice: Subject to any disclaimer, the term of this patent is extended or adjusted under 35 U.S.C. 154(b) by 98 days.

(21) Appl. No.: 17/904,167

(22) PCT Filed: Jan. 7, 2021

(86) PCT No.: PCT/GB2021/050032
§ 371 (c)(1),
(2) Date: Aug. 12, 2022

(87) PCT Pub. No.: WO2021/165634
PCT Pub. Date: Aug. 26, 2021

(65) Prior Publication Data
US 2023/0085143 A1    Mar. 16, 2023

(30) Foreign Application Priority Data
Feb. 17, 2020 (GB) .................................. 2002130

(51) Int. Cl.
*G06F 9/30* (2018.01)
*G06F 9/355* (2018.01)
(52) U.S. Cl.
CPC ........ *G06F 9/3013* (2013.01); *G06F 9/30101* (2013.01); *G06F 9/3016* (2013.01);
(Continued)
(58) Field of Classification Search
CPC . G06F 9/32; G06F 9/322; G06F 9/323; G06F 9/321; G06F 9/324; G06F 9/34;
(Continued)

(56) References Cited
U.S. PATENT DOCUMENTS 4,121,286 A * 10/1978 Venton ................ G06F 12/0253
4,408,274 A * 10/1983 Wheatley ............ G06F 12/1483
711/163
(Continued)

FOREIGN PATENT DOCUMENTS
WO    2012/120267 A1    9/2012

OTHER PUBLICATIONS
Robert N M Watson, et al., "Capability Hardware Enhanced RISC Instructions: CHERI Instruction-Set Architecture (Version 6)", Apr. 30, 2017 (Apr. 30, 2017), XP055577448, Retrieved from the Internet: URL: https://www.cl.cam.ac.uk/techreports/UCAM-CL-TR-907.pdf [retrieved on Apr. 4, 2019] Chapters 3, 4.
(Continued)

*Primary Examiner* — Keith E Vicary
(74) *Attorney, Agent, or Firm* — NIXON & VANDERHYE P.C.

(57) ABSTRACT

An apparatus has processing circuitry, an instruction decoder, and capability registers, each capability register to store a capability comprising a pointer and constraint metadata for constraining valid use of the pointer/capability. In response to a capability-generating address calculating instruction specifying an offset value, a reference capability register is selected as one of a program counter capability register and a further capability register. A result capability is generated for which the pointer of the result capability indicates a window address identifying a selected window within an address space, the selected window being offset from a reference window by a number of windows determined based on the offset value of the capability-generating address calculating instruction. The reference window comprises the window comprising an address indicated by the pointer of the reference capability register.

19 Claims, 10 Drawing Sheets

(52) U.S. Cl.
CPC .......... *G06F 9/30189* (2013.01); *G06F 9/355* (2013.01); *G06F 9/3557* (2013.01)

(58) Field of Classification Search
CPC . G06F 9/342; G06F 9/35; G06F 9/355; G06F 9/3557; G06F 9/3824; G06F 9/30101; G06F 9/3013; G06F 9/30185; G06F 9/30189; G06F 9/468
See application file for complete search history.

(56) References Cited

U.S. PATENT DOCUMENTS

| | | | | |
|---|---|---|---|---|
| 4,498,131 | A * | 2/1985 | Bratt | G06F 12/1483 712/E9.027 |
| 7,043,616 | B1 * | 5/2006 | McGrath | G06F 9/30101 712/E9.035 |
| 9,116,711 | B2 * | 8/2015 | Grocutt | G06F 9/30123 |
| 10,275,365 | B1 * | 4/2019 | Gonion | H04L 9/0618 |
| 2008/0250216 | A1 * | 10/2008 | Kershaw | G06F 9/322 712/205 |
| 2011/0078389 | A1 | 3/2011 | Patel et al. | |
| 2018/0225120 | A1 * | 8/2018 | Barnes | G06F 9/30101 |
| 2018/0349294 | A1 * | 12/2018 | Barnes | G06F 12/1441 |
| 2019/0012455 | A1 * | 1/2019 | Barnes | G06F 9/3013 |
| 2019/0026236 | A1 * | 1/2019 | Barnes | G06F 9/3013 |
| 2019/0034664 | A1 * | 1/2019 | Barnes | G06F 12/1441 |
| 2019/0065408 | A1 * | 2/2019 | Milojicic | G06F 12/1466 |
| 2019/0095356 | A1 * | 3/2019 | Milojicic | G06F 12/023 |
| 2019/0095389 | A1 * | 3/2019 | Barnes | G06F 9/30105 |
| 2019/0121574 | A1 * | 4/2019 | Milojicic | G06F 12/08 |
| 2019/0129864 | A1 * | 5/2019 | Faraboschi | G06F 12/1027 |
| 2019/0272159 | A1 * | 9/2019 | Pizlo | G06F 8/434 |
| 2020/0050454 | A1 * | 2/2020 | Barnes | G06F 9/324 |
| 2020/0117458 | A1 * | 4/2020 | Barnes | G06F 9/3861 |
| 2020/0133679 | A1 * | 4/2020 | Brandt | G06F 9/30101 |
| 2020/0133710 | A1 * | 4/2020 | Barnes | G06F 9/4812 |
| 2020/0142700 | A1 * | 5/2020 | Barnes | G06F 9/30101 |
| 2020/0192800 | A1 * | 6/2020 | Biles | G06F 12/0815 |
| 2020/0201643 | A1 * | 6/2020 | Barnes | G06F 9/30043 |
| 2020/0394119 | A1 * | 12/2020 | Williams | G06F 11/3037 |
| 2021/0026773 | A1 * | 1/2021 | Smith | G06F 12/0875 |
| 2021/0110040 | A1 * | 4/2021 | Boivie | G06F 9/30101 |
| 2021/0232405 | A1 * | 7/2021 | Kottila Veettil | G06F 15/7807 |
| 2021/0232511 | A1 * | 7/2021 | Boettcher | G06F 12/0253 |
| 2021/0294755 | A1 * | 9/2021 | Ayrapetyan | G06F 12/023 |
| 2022/0374349 | A1 * | 11/2022 | Chisnall | G06F 12/0238 |
| 2023/0060666 | A1 * | 3/2023 | Smith | G06F 21/52 |
| 2023/0069266 | A1 * | 3/2023 | Smith | G06F 9/30112 |

OTHER PUBLICATIONS

Woodruff, et al., "CHERI Concentrate: Practical Compressed Capabilities", IEEE Transactions on Computers (vol. 68, Issue: 10, Oct. 1, 2019); pp. 1455-1469; Apr. 30, 2019.

Robert Bedichek, "Some Efficient Architecture Simulation Techniques", Department of Computer Science, FR-35 University of Washington Seattle, Washington 98195; 1990.

* cited by examiner

CAPABILITY-GENERATING ADDRESS CALCULATING INSTRUCTION

The present technique relates to the field of data processing.

Software to be executed by a data processing apparatus may typically be written in a high-level programing language and then compiled into code according to the instruction set architecture supported by the apparatus on which the software is to be executed. For example, the software may originally be written in a higher level language such as Java®, C or C++, and then compiled into a natively supported instruction set architecture such as x86 or AArch64 provided by Arm®.

Some higher level programing languages, such as Java, are considered memory-safe languages because they include run time error detection checks for checking for certain errors relating to memory accesses. In contrast, memory-unsafe languages, such as C and C++, do not include such run time error checks. The enduring prevalence of use of memory-unsafe languages means that in compiled code according to a given instruction set architecture, there may be a large number of memory related errors, such as bounds violations, where an array index supplied by code is outside legitimate bounds of an array, use-after-free errors where an access to a memory location is made after that memory location has already been deallocated or freed for use for another purpose, use-after-return where a memory access to an address associated with a variable used within a function is made after already returning from the function, and so on. Such errors may be vulnerable to exploitation by a malicious party or may cause the program to fail in unpredictable ways.

Memory protection techniques currently in use tend to be relatively coarse-grained in that access permissions for respective regions of memory tend to be defined at the level of an individual process or thread accessing a page of virtual memory, rather than being tied to a particular access to code or data objects being performed within a thread or process.

In a capability-based architecture, capability registers may be provided to store capabilities, where a capability comprises a pointer and constraint metadata for constraining valid use of the pointer or the capability. This approach means that when a particular pointer of a capability is referenced to perform a particular data or instruction access, the associated metadata for constraining that access is provided in the capability itself. Different accesses to the same address from different instructions within the same process can reference different capabilities and hence be subject to different constraints. This can enable more fine-grained compartmentalisation of software running on the processing circuitry, making it harder for attackers to exploit memory usage errors.

At least some examples provide an apparatus comprising: processing circuitry to perform data processing; an instruction decoder to decode instructions to control the processing circuitry to perform the data processing; and a plurality of capability registers, each capability register to store a capability comprising a pointer and constraint metadata for constraining valid use of the pointer or the capability, the capability registers including a program counter capability register for which the pointer represents a program counter address indicative of a current point of program flow; in which: in response to a capability-generating address calculating instruction specifying an offset value the instruction decoder is configured to control the processing circuitry to: select a reference capability register as one of the program counter capability register and a further capability register; and write to a result capability register a result capability for which the pointer of the result capability indicates a window address identifying a selected window within an address space, where a window comprises a contiguous block of addresses of a predetermined size, the selected window is offset from a reference window by a number of windows determined based on the offset value specified by the capability-generating address calculating instruction, and the reference window comprises the window which comprises an address indicated by the pointer of the reference capability register.

At least some examples provide a data processing method for an apparatus comprising processing circuitry and a plurality of capability registers, each capability register to store a capability comprising a pointer and constraint metadata for constraining valid use of the pointer or the capability, the capability registers including a program counter capability register for which the pointer represents a program counter address indicative of a current point of program flow; the method comprising: in response to a capability-generating address calculating instruction specifying an offset value, controlling the processing circuitry to: select a reference capability register as one of the program counter capability register and a further capability register; and write to a result capability register a result capability for which the pointer of the result capability indicates a window address identifying a selected window within an address space, where a window comprises a contiguous block of addresses of a predetermined size, the selected window is offset from a reference window by a number of windows determined based on the offset value specified by the capability-generating address calculating instruction, and the reference window comprises the window which comprises an address indicated by the pointer of the reference capability register.

At least some examples provide a computer program to control a host data processing apparatus to provide an instruction execution environment for execution of target code, the computer program comprising: instruction decoding program logic to decode instructions of the target code to control the host data processing apparatus to perform data processing; and register maintenance program logic to maintain a data structure representing a plurality of capability registers, each capability register to store a capability comprising a pointer and constraint metadata for constraining valid use of the pointer or the capability, the capability registers including a program counter capability register for which the pointer represents a program counter address indicative of a current point of program flow; in which: in response to a capability-generating address calculating instruction specifying an offset value, the instruction decoding program logic is configured to control the host data processing apparatus to: select a reference capability register as one of the program counter capability register and a further capability register; and write to a result capability register a result capability for which the pointer of the result capability indicates a window address identifying a selected window within an address space, where a window comprises a contiguous block of addresses of a predetermined size, the selected window is offset from a reference window by a number of windows determined based on the offset value specified by the capability-generating address calculating instruction, and the reference window comprises the window which comprises an address indicated by the pointer of the reference capability register.

The computer program may be stored on a computer-readable storage medium. The storage medium may be a transitory storage medium or a non-transitory storage medium.

Further aspects, features and advantages of the present technique will be apparent from the following description of examples, which is to be read in conjunction with the accompanying drawings, in which:

FIG. 1 schematically illustrates an example of a data processing apparatus;

Figure 1:
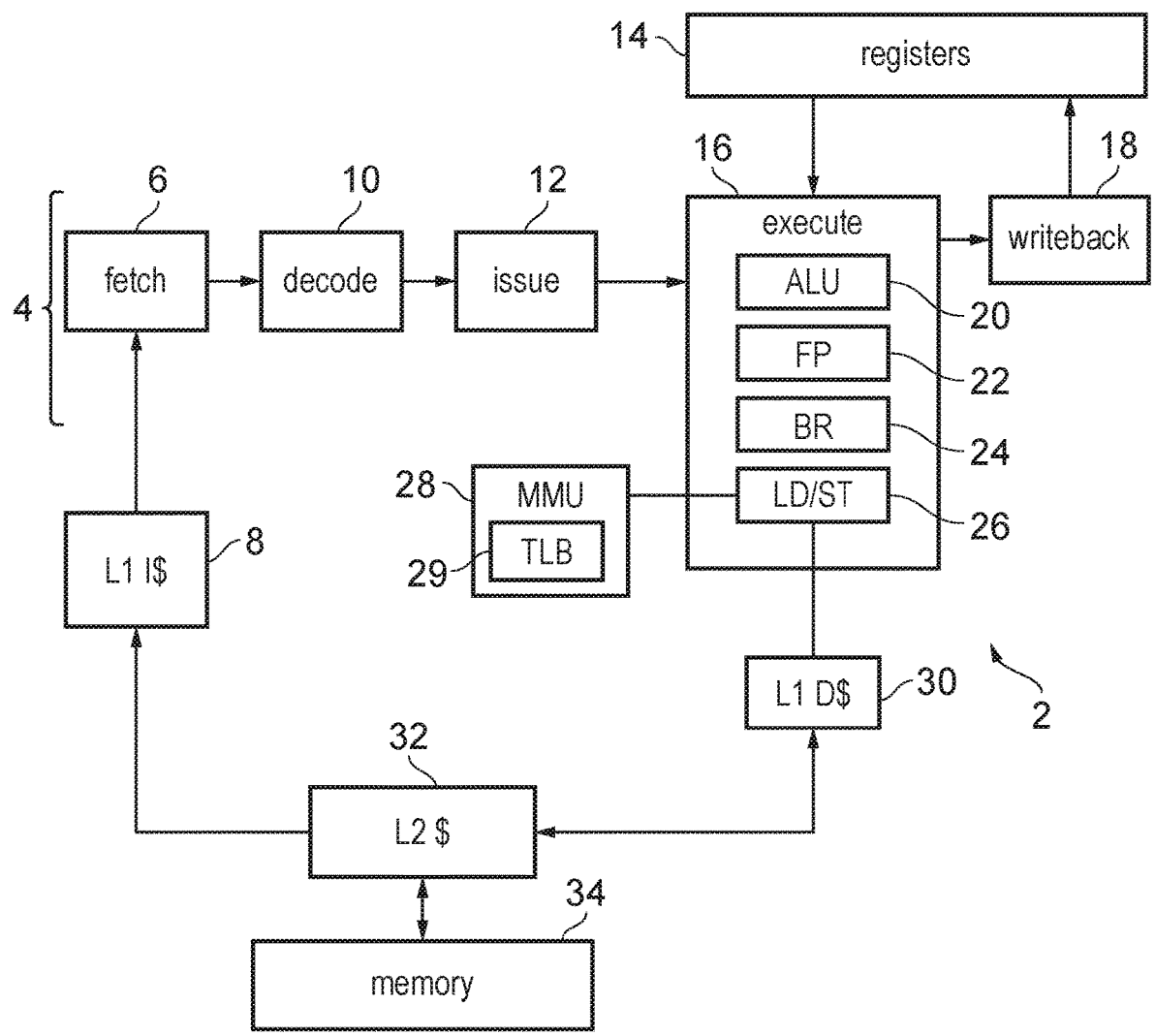

An apparatus has processing circuitry to perform data processing and an instruction decoder to decode instructions to control the processing circuitry to perform the data processing. A number of capability registers are provided, each capability register to store a capability comprising a pointer and associated constraint metadata for constraining valid use of the pointer or the capability. The capability registers include a program counter capability register for which the pointer represents a program counter address indicative of a current point of program flow.

The instruction decoder and processing circuitry support a capability-generating address calculating instruction which specifies an offset value. In response to the capability-generating address calculating instruction, the instruction decoder controls the processing circuitry to select, as a reference capability register, one of the program counter capability register and a further capability register, and to write to a result capability register a result capability for which the pointer of the result capability indicates a window address identifying a selected window within an address space. Here, a "window" refers to a contiguous block of addresses of some predetermined size, e.g. 4 kB, 8 kB or 16 kB for example. The size of each window could be a fixed value hardwired for a given processor implementation or could be configurable on a given processor implementation so that the window size can be selected based on some programmable parameter (e.g. a value in a control register). The selected window identified by the window address of the result capability may be a window which is offset from a reference window by a number of windows determined based on the offset value specified by the capability-generating address calculating instruction. The reference window is the window which comprises an address indicated by the pointer of the reference capability register. The capability-generating address calculating instruction helps to support position-independent addressing of data and program code of an executable component, which supports sharing code and read-only data between address spaces, at a different address in each address space By selecting the reference capability register as either the program counter capability register or a further capability register, this allows the data and code components of an executable to be described by different capabilities, allowing data to be multiply instanced within an address space. Additionally, different constraint metadata can limit the valid use of the result capability generated by the address calculating instructions. For example, it may be desirable that the code component of an executable is read only but is allowed to be executed, while the data component of an executable is writable but is not allowed to be executed, to preserve security. Also, it can be useful to allow multiple instances of data components of a given executable to be established and this is supported by the address calculating instruction because it is possible to select a further capability register to derive the result capabilities used to address the respective components, rather than relying solely on a program counter capability register which would not be able to be set to different values for different instances of data associated with a given piece of code as this would change the current point of program flow. This approach is counterintuitive because normally with position-independent addressing of the code or data for a given executable component one would assume that the references to such code or data should be determined with reference to the program counter only, so that if the code is moved then the data access instructions within the code also by definition have their relative-addressed target addresses moved. However, the capability-generating address calculating instruction described above helps to support improved security by enabling position-independent executables to operate on multiple, securely isolated instances of their own data within an address space, a lower cost alternative to multiple address spaces, and to control memory access at program-object granularity. Security can therefore be improved.

As well as the capability-generating address calculating instruction, the processing circuitry and instruction decoder could also support a non-capability-generating address calculating instruction. The non-capability-generating address calculating instruction may cause the instruction decoder to control the processing circuitry to write to a destination register an integer window address determined based on an offset value specified by the non-capability generating address calculating instruction, with the offset being applied relative to a window address of a window including a non-capability program counter address. Hence, for the non-capability-generating instruction, there may be no selection of which address to use as the reference for determining the window address using the offset, but instead the program counter is used as the reference. The non-capability program counter address could be stored in a separate integer register from the program counter capability register, or alternatively in some implementations, to reduce hardware costs, the non-capability program counter address could be stored in the part of the program counter capability register which for capability-using instructions would store the pointer of the program counter capability register. That is, the program counter register could be the same register regardless of whether an instruction requires a capability or not, and while for capability-related instructions the pointer and associated constraint metadata may be referenced when accessing the program counter capability register, for instructions not executing with reference to capabilities the constraint metadata can be ignored and the integer program counter value read from the field of the program counter capability register which provides the pointer.

In some implementations, the capability-generating address calculating instruction could be an instruction with a different instruction encoding to the non-capability-generating address calculation instruction.

However, in other examples the processing circuitry may have a capability mode and a non-capability mode, and the capability-generating address calculating instruction may comprise an address calculating instruction processed by the processing circuitry in the capability mode. In some examples, the capability-generating address calculating instruction and non-capability-generating address calculating instruction may have the same instruction encoding, with the current mode specifying whether a given address calculating instruction should be treated as a capability-generating address calculating instruction or a non-capability-generating address calculating instruction. For example, a value stored in a control register could specify the current mode, and certain instructions may be used to select or switch which mode is the current mode.

In other examples, whether a given address calculating instruction is the capability-generating address calculating instruction or the non-capability-generating address calculating instruction could depend on a combination of both the instruction encoding and the current mode of operation of the processing circuitry.

For the capability-generating address calculating instruction, the selection of whether the reference capability register is the program counter capability register or the further capability register can be controlled in different ways. In one example the instruction decoder may control the processing circuitry to select whether the reference capability register is the program counter capability register or the further capability register based on a selection parameter specified by an instruction encoding of the capability-generating address calculating instruction. This can allow a programmer or a compiler to explicitly indicate in the instruction encoding which of the program counter capability register and the further capability register should be used for calculating the window address written to the pointer of the result capability. For example, for program code references the reference capability register could be selected to be the program counter capability register and for data accesses the reference capability register could be the further capability register. It will be appreciated that the precise instances when the program counter capability register or further capability register is selected is chosen by the programmer or the compiler of the software executing on the processing apparatus, and so is not a feature of the hardware or the instruction set architecture of the processor apparatus. From the point of view of the hardware or the ISA it is sufficient that the programmer or compiler is given the choice of which capability register to reference. By using a selection parameter specified in the instruction encoding to select which register is the reference capability register, this can be more efficient to implement in hardware, as the selection is based on a comparison of the selection parameter rather than needing further parameters to be derived or compared.

The selection parameter could be encoded in a number of different ways within the instruction encoding of the capability-generating address calculating instruction. For example, in some implementations the selection parameter could be a dedicated field of the instruction provided to indicate which capability register is the reference capability register.

However, in examples using the modal approach for distinguishing between capability-generating and non-capability-generating address calculating instructions, the address calculating instruction may have an encoding which may also be used when in a non-capability mode (a mode in which the capability-based protections are not being used). Some legacy code written for a processor which does not support the capability mode may already have included an address calculating instruction which specifies an offset value. It may be desirable to allow such legacy code to continue to function correctly in non-capability mode, which may mean that there may be no unused values in the instruction encoding for specifying an additional selection parameter which specifies which capability register should be treated as the reference capability register. Hence, one approach to support better compatibility with legacy code is that the selection parameter can be encoded using a bit of an instruction encoding of the address calculating instruction which, in the non-capability mode, represents part of the offset value (e.g. the most significant bit). Although this reduces the maximum size of the offset value which can be encoded in the address calculating instruction, from analysis of real life program code using the address calculating instruction as a non-capability-generating instruction, the inventor found that real program code does not typically use the full range capable of being represented in the offset field, and no instance of existing code has yet been found which requires the full extent of the offset field. Hence, there is at least one spare bit which could be re-encoded to represent other information without limiting the utility of the instruction. Hence, by repurposing a bit of the instruction encoding which represents the most significant bit of the offset value to instead be interpreted as the selection parameter in the capability mode, it is expected that even if legacy code is executed within the capability mode, that legacy code can still function correctly as the legacy code will not have used that most significant bit of the offset value anyway. Hence, this approach improves backwards compatibility.

Alternatively, another way of controlling the selection of the reference capability register can be to make this selection independent of any explicit selection parameter specified by the instruction encoding of the capability-generating address calculating instruction, but instead to select which of the program counter capability register and the further capability register is the reference capability register based on a determination of whether a program-counter-relative address is within an allowable range specified by the constraint metadata of the program counter capability register. This program-counter-relative address may correspond to the result of applying the offset value of the address calculating instruction to the pointer stored in the program counter capability register. The program counter capability register is selected when the program-counter-relative address is within the allowable range, while the further capability register is selected when the program-counter-relative address is outside the allowable range. This approach again can be good for backwards compatibility because it means that it is not necessary to indicate in the instruction encoding itself which register is to be used, but rather this can be inferred from the offset value specified by the instruction and the constraint metadata in the program counter capability register. This means that legacy code written without capability-based processing in mind can still function as a capability-generating address calculating instruction without modification (if executed in capability mode). This means that even if not explicitly written to include a selection parameter as discussed above, the legacy code can still benefit from the protections provided by enabling different capabilities to be defined for different portions of the same executable and from multiple instancing of its own data. This may improve security for legacy code.

In any case, even for new code written for a system supporting capabilities, it may still be a valid architectural design choice to use the comparison between the program-counter-relative address and the allowable range in the constraint metadata of the program counter capability register to select which reference capability register to use, to preserve an additional bit of instruction encoding space for other purposes. Hence, this approach of comparing the program-counter-relative address and the allowable range can be used even in an example where the capability-generating address instruction has a dedicated instruction encoding distinct from non-capability-generating address instructions.

In some implementations, it may be possible to first determine which register should be the reference capability register based on the comparison of the program counter relative address with the allowable range specified by the constraint metadata of the program counter capability register, and then to calculate the window address of the result capability by applying the offset to the pointer of whichever register is selected as the reference capability register. However, in the case when the reference capability register is the program counter capability register, this second calculation may be redundant as the program-counter-relative address used to determine which register should be selected as the reference capability register may already effectively indicate the result that would be generated if the reference capability register is the program counter capability register.

Hence, a more efficient approach can be that, in response to the capability-generating address calculating instruction, the instruction decoder controls the processing circuitry to determine the program-counter-relative address; compare the program-counter-relative address with the allowable range specified by the constraint metadata of the program counter capability register; when the program-counter-relative address is within the allowable range specified by the constraint metadata of the program counter capability register, return the program-counter-relative address as the pointer of the result capability; and when the program-counter-relative address is outside the allowable range specified by the constraint metadata of the program counter capability register, return as the pointer of the result capability a pointer corresponding to P+B−U−C, where P is the program-counter-relative address, B is a base address of the allowable range specified by the constraint metadata of the further capability register, U is an upper limit address of the allowable range specified by the constraint metadata of the program counter capability register, and C is a constant value. C may be an arbitrary constant chosen for a given ISA. C could be zero for example.

With this approach, in cases where the program-counter-relative address is found to be outside the range allowed by the constraints of the program counter compatibility, it can be assumed that the window address should instead be calculated relative to the pointer of the further compatibility, and so an adjustment can be applied to convert the program-counter relative address into the window address to be returned as the pointer of the result capability. This avoids the need to use up instruction encoding space to explicitly indicate which reference capability register should be used, and means that legacy code (which cannot indicate the reference capability register using the instruction encoding) is still able to use the further capability register as the reference capability register.

It will be appreciated that the two alternative ways of selecting the reference capability register described above could in some implementations both be implemented, with different modes of operation (or different sub-modes of the capability mode), a parameter specified in the instruction encoding of the address calculating instruction, or another control parameter, selecting which of these approaches is used. Hence, in a first variant of the capability-generating address calculating instruction and/or the capability mode the reference capability register could be selected based on the selection parameter, and in a second variant of the capability-generating address calculating instruction and/or the capability mode the reference capability register could be selected based on the comparison of the program-counter-relative address and the allowable range in the program counter capability register. Supporting both approaches can be useful for testing and could also enable configuration of whether to incur the more performance intensive operations for checking the program-counter-relative address against the allowable range and then subsequently calculating the window address based on the base address of the further capability register if necessary, based on whether the code being executed supports a form of the instruction which uses the selection parameter to explicitly indicate which reference capability register is needed.

Other implementations may only support one or other of these approaches for selecting the reference capability register.

For capability-controlled instructions (e.g. instructions executed in the capability mode and/or instructions having an encoding indicating that they are capability-controlled instructions), instruction fetches and data accesses may have their target addresses checked against allowable range information specified in the constraint metadata of at least one capability register. Instruction fetch addresses may be checked against the allowable range indicated by the constraint metadata of the program counter capability register. For capability-specifying data access instructions which explicitly reference a particular capability register, the capability in that capability register may be used to check whether the data access is to a target address in the allowable range.

However, it is also possible that some data access instructions which do not explicitly reference a capability register could be executed as a capability-controlled instruction, e.g. legacy code written for a device not supporting capabilities. Hence, for at least one type of capability-controlled data access instruction (e.g. a type of data access instruction which does not explicitly reference a capability register), the instruction decoder may control the processing circuitry to trigger signalling of a fault when a target address determined based on at least one parameter of the data access instruction is outside both the allowable range indicated by the constraint metadata of the program counter capability register and the allowable range indicated by the constraint metadata of the further capability register.

It will be appreciated that not all capability-controlled instructions would require checking of the target address against the ranges of both the program counter capability ranges and the further capability register. There may also be supported other capability-controlled instructions (or instructions executed in other variants of the capability mode), for example a variant which calculates all window addresses relative to the program counter capability register in response to the address calculating instruction, in which case it may not be needed for data accesses to be checked against the constraint metadata of the further capability register.

In response to a relative-addressed capability-controlled data access instruction specifying a target capability register and an intra-window offset value, the instruction decoder may perform a data access to a target address determined based on adding the intra-window offset value to the pointer stored in the target capability register. Hence, the address of actual data or code to be accessed in memory can be obtained using two instructions in combination, first the capability-generating address calculating instruction to determine the window address identifying the window of the address space in which the code or data is located, and then a subsequent relative-addressed capability-controlled data access instruction to determine the address of the actual code or data by adding the intra-window offset value to the pointer of the result capability generated by the capability-generating address calculating instruction. Often an executable may need to access multiple different pieces of data or code within the same window of the address space and so by using the address calculating instruction to calculate the window address identifying the window, multiple subsequent data access instructions could each reference the same result capability generated by the address calculating instruction to avoid the overhead of the full address calculating operation on every data access. Splitting the address generation into two instructions helps support larger offsets than can fit within the encoding of a single instruction.

The constraint metadata for a given capability may specify access permissions governing use of the pointer of the capability. For example the access permissions may specify at least one of: a read permission value indicating whether a read permission is granted to provide permission to use the capability for controlling a read data access; a write permission value indicating whether a write permission is granted to provide permission to use the capability for controlling a write data access; and an execute permission value indicating whether an execute permission is granted to provide permission to use the capability for determining a branch target address or for controlling fetching of an instruction for execution. It will be appreciated that the access permissions could in some implementations also specify other types of permissions than read, write or execute permissions. Hence, at the time of use of a given capability the processing circuitry can check the permissions specified in that capability to determine whether to permit the current operation (e.g. a read operation, write operation, attempt to fetch an instruction, or attempt to set the program counter capability based on the address indicated by the pointer of the capability).

It can be useful for the processing circuitry, in response to the capability-generating address calculating instruction, to set different access permissions for the result capability depending on whether the reference capability register is the program counter capability register or the further capability register. This can help to reduce the likelihood that a further instruction needs to be executed after the address calculating instruction to set the access permissions, improving code density and performance.

More particularly, when in the capability mode, in response to the address calculating instruction, when the reference capability register is the program counter capability register, the processing circuitry is configured to copy the read permission value and the execute permission value specified in the constraint metadata of the program counter capability to the constraint metadata of the result capability, and to set the write permission value for the result capability to indicate that write permission is not granted; and when the reference capability register is the further capability register, the processing circuitry is configured to copy the read permission value and the write permission value specified in the constraint metadata of the further capability register to the constraint metadata of the result capability, and to set the execute permission value for the result capability to indicate that execute permission is not granted. Hence, for code components of executables which are likely to reference the program counter capability register when executing the address calculating instruction, read and execute permission may be granted (if already granted for the program counter capability register) but write permission is by default not granted for the result capability (even if granted for the program counter capability), which is more appropriate for program code components. For data components of an executable which are more likely to reference the further capability register, the access permissions for the result may be set to specify that the read permission and the write permission are granted (if already granted for the further capability) but that execute permission is not granted, to prevent inappropriate operations caused by attempting to decode data as an instruction. This means that it can be prevented from granting a process both write permission and execute permission to the same region of memory, which can be dangerous in some scenarios as it may cause vulnerabilities which an attacker could exploit to manipulate program flow so that access to inappropriate data is allowed. Hence, by setting the access permissions for the result capability in the way discussed above, security can be improved. The copying of the read/execute permissions for the program counter capability and the read/write permissions for the further capability ensures that the permissions of the result capability are either the same as, or less permissive than, the permissions of the reference capability, so that it is not possible for the permissions to increase as a result of executing the capability-generating address calculating instruction (which may be a desirable constraint for providing security).

One might expect that it may not always be desirable to grant read permission in the case when the program counter capability register is the reference capability register or to grant write permission when the reference capability register is the further capability register. However, in practice it is recognised that in these cases then the capability-generating address calculating instruction could be followed with a subsequent instruction which narrows the access permissions granted to exclude the permission not desired, so this is not in practice a problem. Further analysis of why granting an excess read permission or an excess write permission in response to the address calculating instruction is not a problem is presented below.

In one example, a processor architecture may define (among the capability registers) a certain default data capability register which stores a default data capability for constraining use of pointers represented using non-capability operands of instructions executed as capability-controlled instructions. For example, the default data capability register is particularly useful for dealing with legacy code written for a system not supporting capabilities. When such legacy code is executed in a capability mode, references to pointers made by the legacy code can be policed using the capability defined in the default data capability register.

In some implementations, in response to at least one type of capability-controlled data access instruction, the instruction decoder may control the processing circuitry to perform a data access to a target address determined by at least one capability operand of the data access instruction, without relocating the target address based on the capability stored in the default data capability register. This avoids the need to reference the default data capability register for each data access.

An alternative approach to providing the ability to select which reference capability register is used in response to a capability-generating address calculating instruction would be to always use the program counter capability register as the reference capability register at the time of executing the capability-generating address calculating instruction, but at the time of performing a subsequent data access using the window address calculated from the program counter capability register, a further offset could be applied based on the range information specified in the default data capability register, to allow for separate relocation of data components of an executable from the location of the code components. However, the inventor recognised that in practice the window address calculated by the capability-generating address calculating instruction may be used multiple times to control several different data accesses to respective data addresses within the same window, and so in practice for each instance of executing the capability-generating address calculating instruction, subsequent data accesses using the result of the capability-generating address calculating instruction may be executed much more frequently. Hence, relocating the target address based on the capabilities stored in the default data capability register on every data access may in practice reduce performance to a greater extent than the performance cost of providing additional checks to select which reference capability register is used for the capability-generating address calculating instruction, due to the relative frequency with which the data access instructions are executed compared to the address calculating instruction. This may be the case even if, as in the example where the reference capability register is selected based on the comparison of the program counter relative address with the allowable range in the program counter capability register, these operations are relatively slow for the capability-generating address calculating instruction. Hence, counter-intuitively, even if the example operations discussed above for the capability-generating address calculating instruction are relatively slow (which they may be especially in embodiments where the range information for a given capability is not encoded directly in the constraint metadata, but is represented in a compressed form requiring decompression before use), the added delay of selecting a reference capability register in response to the capability-generating address calculating instruction may surprisingly improve overall processing performance when processing real program code. Even though seemingly these operations provide added latency for the capability-generating address calculating instruction, due to the saving of not needing to relocate every data access based on the default data capability register at the time of executing a data access instruction, the overall performance can be better.

The further capability register can be implemented in different ways. In one example, the default data capability register mentioned above could serve as the further capability register which can be selected as the reference capability register for the capability-generating address calculating instruction. This may be useful because it means that, for legacy code, there is consistency between the capability used to generate relative addresses of a window containing the data components based on the reference capability register in response to an address calculating instruction, and the data capability register against which subsequent accesses will be checked. Also, for newer code written to explicitly support the capability mode, for which the data accesses to memory may explicitly reference a particular capability controlling their access, then the default data capability register may effectively be unused, and so by reusing that register as an alternative reference capability register which can be selected by a capability-generating address calculating instruction, this avoids the need to use up an additional general purpose capability register to provide the alternative reference address to be used instead of the program counter capability, saving hardware and reducing register pressure. Hence, it can be particularly useful for the further capability register to be the default data capability register, both for legacy code and newer code.

However, in another example the capability registers may include a number of general purpose capability registers accessible by capability specifying instructions in the capability mode, and the further capability register may be a predetermined one of those general purpose capability registers.

In other examples, the further capability register could be another type of register, other than the default data capability register or a general purpose capability register. For example, a system register or control register could be allocated for the purpose of providing the alternative further reference capability for the address calculating instruction.

The window address generated in response to the capability-generating address calculating instruction could be represented in different ways. In some cases, the window address could be an absolute address directly identifying the selected window. This approach may make subsequent data/instruction accesses using the address less complex.

On the other hand, in other implementations the capability-generating address calculating instruction may return a result capability in which the pointer defines the window address as a relative address relative to a base address of the allowable range specified by the constraint metadata of the program counter capability register. In this case, then at the time of performing a relative-addressed memory access in response to a relative-addressed capability-controlled data access instruction which specifies a target capability register and an intra-window offset value, the instruction decoder may control the processing circuitry to perform a data access to a target address determined based on adding the intra-window offset value and the base address of the allowable range specified by the constraint metadata of the program counter capability register to the pointer stored in the target capability register. Hence, with this approach data accesses may be slightly slower, because an additional relocation of each data access based on the base address of the program counter capability register is needed for each subsequent data access which uses the result of the address calculating instruction. However, this approach has the advantage that the executable code does not gain visibility of the absolute address of the data or instruction being referenced, so that less information is learnt about the layout of memory on a particular device, which can help to improve security.

Whether a given processor implementation generates the window address as an absolute address or a relative address can be a design choice for a particular system implementation and some micro-architectural implementations may only support one or other of these approaches.

Alternatively, some systems may support different variants of capability-generating address calculating instructions (or different variants of the capability mode), including one variant where the capability-generating address calculating instruction generates the window address of the result capability as an absolute address, and another which generates the window address as a relative address relative to the base address in the program counter capability register.

The techniques discussed above can be implemented in a hardware apparatus which has circuit hardware implementing the instruction decoder and the processing circuitry described above, which support the capability-generating address calculating instruction as part of the native instructions set architecture supported by the instruction decoder and processing circuitry.

However, in another example the same techniques may be implemented in a computer program (e.g. an architecture simulator or model) which may be provided for controlling a host data processing apparatus to provide an instruction execution environment for execution of instructions from target code. The computer program may include instruction decoding program logic for decoding instructions of the target code so as to control a host data processing apparatus to perform data processing. Hence, the instruction decoding program logic emulates the functionality of the instruction decoder of a hardware apparatus as discussed above. Also, the program may include register maintenance program logic which maintains a data structure (within the memory of the host apparatus) which represents (emulates) the registers of the instruction set architecture being simulated by the program. The emulated registers may include the capability registers described above. The instruction decoding program logic includes support for the capability-generating address calculating instruction which has the same functionality as described above for the hardware example. Hence, such a simulator computer program may present, to target code executing on the simulator computer program, a similar instruction environment to that which would be provided by an actual hardware apparatus, even though there may not be any actual hardware providing these features in the host computer which is executing the simulator program. This can be useful for executing code written for one instruction set architecture on a host platform which does not actually support that architecture. Also the simulator can be useful during development of software for a new version of an instruction set architecture while software development is being performed in parallel with development of hardware devices supporting the new architecture. This can allow software to be developed and tested on the simulator so that software development can start before the hardware devices supporting the new architecture are ready yet.

The specific examples described with reference to the Figures below use a modal approach for determining whether a given address calculating instruction is a capability-generating address calculating instruction or a non-capability-generating address calculating instruction. It will be appreciated that this is not essential, and other examples could use different instruction encodings to distinguish the capability-generating address calculating instruction from the non-capability-generating address calculating instruction (or to distinguish capability-controlled instructions from non-capability-controlled instructions).

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34. A memory management unit (MMU) 28 is provided for performing address translations between virtual addresses specified by the load/store unit 26 based on operands of data access instructions and physical addresses identifying storage locations of data in the memory system. The MMU has a translation lookaside buffer (TLB) 29 for caching address translation data from page tables stored in the memory system, where the page table entries of the page tables define the address translation mappings and may also specify access permissions which govern whether a given process executing on the pipeline is allowed to read, write or execute instructions from a given memory region. The access permissions specified in the page tables accessed by the MMU 28 may be relatively coarse-grained in that they may specify permissions for a particular memory region which apply to an entire software process as a whole, so that it is not efficient to use the page tables to provide different levels of access permissions for different sub-portions of instructions within a software process.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

Figure 2:
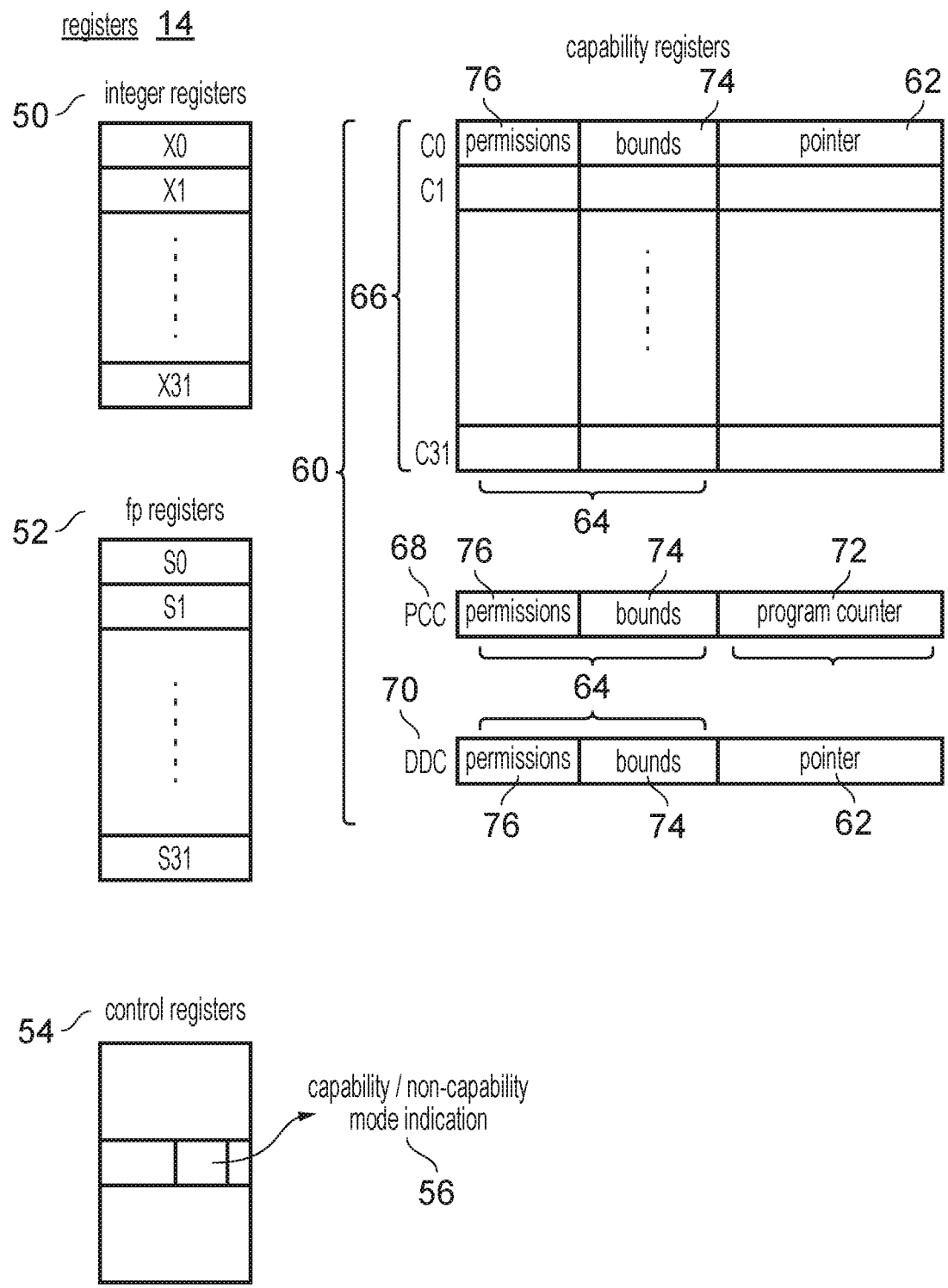
FIG. 2 shows an example of registers of the apparatus including capability registers.

FIG. 2 illustrates an example of some of the registers 14 of the processing apparatus 2. It will be appreciated that FIG. 2 does not show all of the registers which may be provided and there could be additional registers.

The registers may include a set of general purpose integer registers 50 for storing integer operands and results of processing operations performed in response to integer processing instructions, and a set of floating point registers 52 for storing floating point operands or results. Some implementations may not support floating point processing and in this case the floating point registers can be omitted. Also, the registers include a number of control registers 54 which define various control parameters which may control the processing of instructions by the processing pipeline. For example, the control registers 54 may include mode indicating values which specify the current mode of operation of the system, control registers for defining whether certain optional architectural features are implemented or not, and condition status flags which are set in response to outcomes of processing operations and may be tested by conditional instructions to determine whether to perform a conditional operation.

While a variety of information will be stored in the control registers 54, one particular item of control state may be a capability/non-capability mode indication 56 which specifies whether the processing pipeline is currently operating in a capability mode or a non-capability mode. The capability mode is supported by a number of architectural features which allow accesses to memory (either for data accesses in response to load/store instructions or for instruction accesses initiated by the fetch stage 6) to be subject to additional security checks based on constraints specified in association with a pointer used to access the memory.

When in the capability mode, the processing pipeline can access a set of capability registers 60 which store capabilities, where a capability comprises a pointer 62 which can be used to form addresses for data or instruction memory accesses, and a set of associated constraint metadata 64 which limits the valid usage of the pointer 62 that is permitted. The capability registers 60 include a set of general purpose capability registers 66 which can generally be referenced by instructions processed by the pipeline in capability mode, either acting as a source register or a destination register for a processing operation. Also, the capability registers 66 include some special purpose capability registers including a program counter capability (PCC) register 68 and a default data capability (DDC) register 70. The PCC register 68 provides in its pointer field a program counter value 72 which in capability mode represents the instruction address of the current point of execution reached by the pipeline. The associated constraint metadata 64 can be used to check whether instruction fetches from the address derived from the program counter are allowed to proceed (or whether updates to the PCC 68 following a branch or other program flow altering operation are permitted). The DDC register 70 defines constraint metadata 64 which can be imposed on memory accesses performed in response to non-capability memory access instructions which do not directly identify that they are to use capabilities, but rather reference the integer registers 50 for forming their address operands. This can be useful for allowing legacy code written for a system which did not support the capability mode to have the memory accesses triggered by the legacy code protected by the capability mechanism provided.

For each of the capabilities in the respective capability registers 60, the constraint metadata 64 may specify bounds information 74 and permissions 76.

The bounds information 74 defines an allowable range for the pointer 62 in the corresponding capability. The bounds information 74 may specify a base address defining the lower bound of the allowable range for the pointer 62 and an upper limit address specifying the upper bound for the allowable range for the pointer 62. In some implementations, the bounds information 74 may be compressed, so that rather than explicitly identifying the base address and upper limit address as a full address with the same number of bits as the pointer itself, the bounds 74 may be stored in an encoded form which requires fewer bits. For example, each of the upper and lower bounds could be represented in a floating-point-like format using a bounds value indicating the significant bits of the upper or lower bound address and an exponent which indicates a number of bits by which the bounds value should be shifted to give the actual lower/upper limit address (the upper and lower bounds could both share the same exponent value). While this may reduce the precision available for defining the allowable range, by compressing the bounds information this greatly reduces the storage overhead of the capability registers, otherwise storing upper and lower bound addresses in full address form in addition to the pointer itself could lead to the capability registers being at least three times the size of an integer register storing an address. An example of an encoding scheme which can be used for the bounds information is described in Woodruff et al, "CHERI Concentrate: Practical Compressed Capabilities", IEEE Transactions on Computers 68.10 (2019): 1455-1469. However, it will be appreciated that other encoding schemes could also be used.

The permissions 76 of a given capability define whether one or more types of access right are granted for the use of the corresponding pointer 62. For example the permissions may indicate whether a read permission is granted to provide permission to use the pointer of the capability for controlling a read (load) data access, whether a write permission is granted to provide permission to use the pointer of the capability for controlling a write (store) data access, and whether execute permission is granted providing permission to use the pointer 62 of the capability for determining a branch target address or for controlling fetching of an instruction for execution. In one example, separate permission flags may indicate whether each type of permission is granted or prohibited. Alternatively, a combined encoding of the permissions field 76 may be provided which selects one of a number of permission states with each permission state corresponding to a different combination of whether the read, write and/or execute permissions is granted. Hence it is not essential to provide a separate flag for each type of permission and instead a common state value could indicate which combination of permissions is allowed or not allowed for use of the corresponding pointer 62.

Hence, by defining the constraint metadata 64 associated with a given pointer 62, an attempt to fetch an instruction from an address defined using the pointer, or an attempt to carry out a data access based on an address derived from a specified capability register, can be checked against the corresponding constraint metadata 64 to check whether the memory access is allowed. If the bounds 74 are stored in compressed form then such checks may need the stored bounds values to be uncompressed to allow comparison of the pointer 62 against the bounds 74. Hence, if there is an attempt to perform an instruction fetch based on the PCC 68, but the program counter value is outside the valid bounds 74 specified by the PCC or the permissions 76 indicate that there is no execute permission for use of that program counter value, then a fault may be triggered. Also, if there is a load/store instruction executed which specifies its address using a reference to a particular capability register then if the instruction is a load instruction and there is no read permission indicated by the permissions 76 or the instruction is a store instruction and there is no write permission, then a fault may be generated, and also a fault may be generated if the pointer 62 (or the address calculated relative to the pointer) lies outside the valid bounds 74 of the capability.

Unlike the definition of access permissions in the MMU 28, which is typically defined coarsely per process, the use of capabilities enables more fine-grained control over access to memory because the program instruction which specifies a particular capability register thus provides an indication of the intention of that instruction, in the sense that it is intended to access a limited region of memory within certain bounds and certain limits on what use of that region is permitted. A different instruction at a different part of the program code for a given software process may specify a different capability register and thus be subject to a different set of permissions without that portion of code needing to be separated into a different software process (as may be needed for cases where the different levels of access control is to be controlled solely using an MMU 28). This capability approach makes it much simpler to partition access rights for different sandboxed components within a software process. This can help to improve security and avoid attackers being able to exploit certain memory related usage errors which may otherwise allow access to data that should not be accessed.

As well as checking capability permissions or bounds at the time of accessing memory, it is also possible for certain instructions to check the constraint metadata of the capability at other times. For example some instructions which set the pointer 62 of a given capability register could trigger a check of whether the pointer is within the corresponding bounds 74, although this is not essential (as if a check is performed when the pointer is subsequently used to control a memory access then this check on setting the pointer may be redundant).

It will be appreciated that FIG. 2 shows an architectural view of the registers which are available for access by instructions processed by the pipeline 4. However, the physical registers implemented in hardware to provide the data values associated with these architectural registers could differ from the layout shown in FIG. 2. For example in an out-of-order processor the register file 14 may have a greater number of physical registers than the number of architectural registers specified in a given one of the integer register set 50, capability register set 60 or floating point register set 52, and register renaming may be used to map the architectural register specifiers to the physical registers provided in hardware.

Also, while from an architectural point of view the capability registers 60 are shown as separate from the integers 50, in some hardware implementations the pointer field 62 of some of the capability registers 60 may actually share the same hardware storage elements with corresponding integer registers 50. For example, the program counter pointer field 72 of the PCC register 68 in capability mode may be reused to provide an integer program counter in non-capability mode, where the integer program counter indicates the address of the instruction representing the current point of execution reached in non-capability mode. During non-capability mode the constraint fields 74, 76 of the PCC 68 could be ignored.

Figure 3:
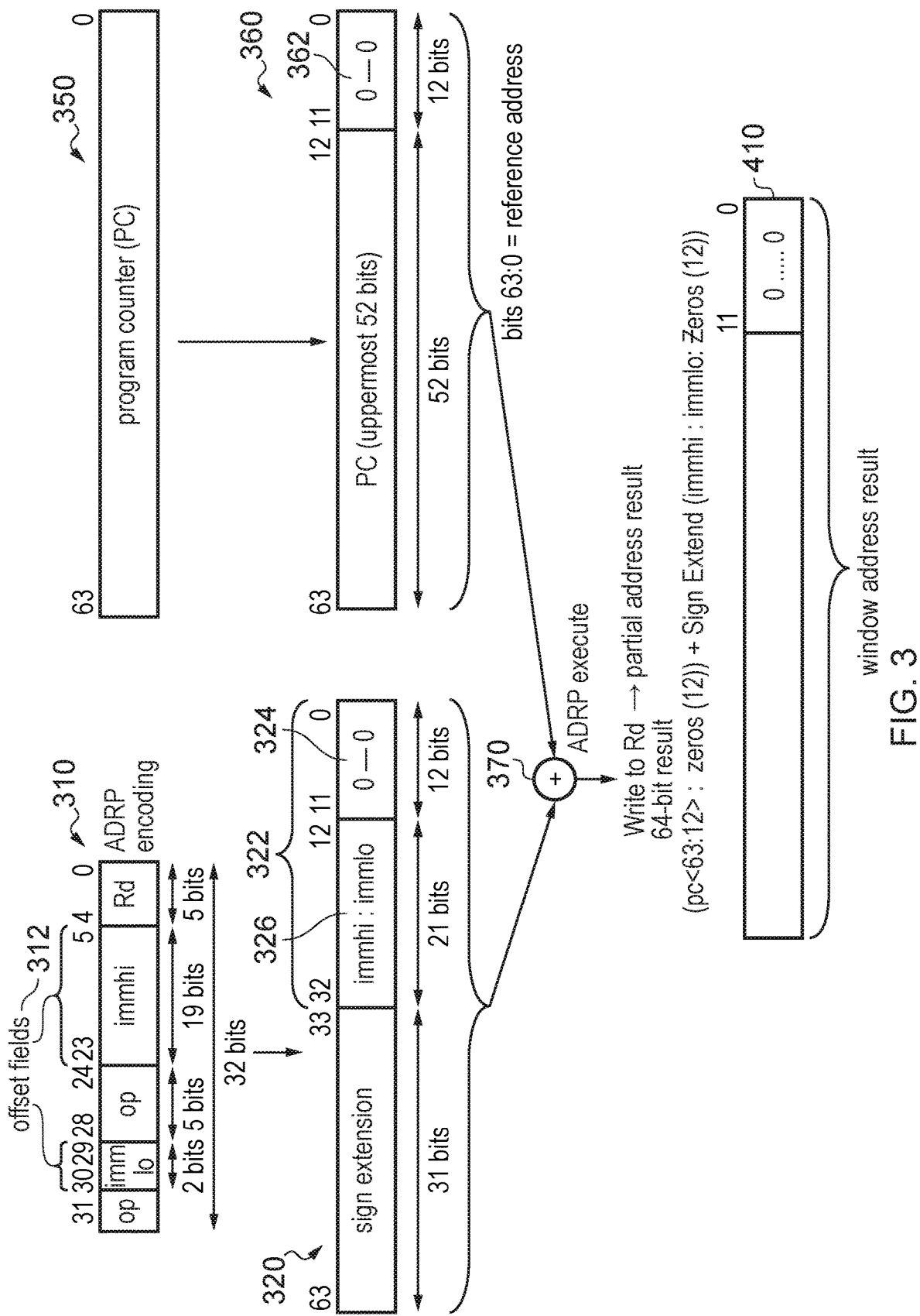
FIG. 3 shows an example of the encoding and functionality of an address calculating instruction.
Figure 4:
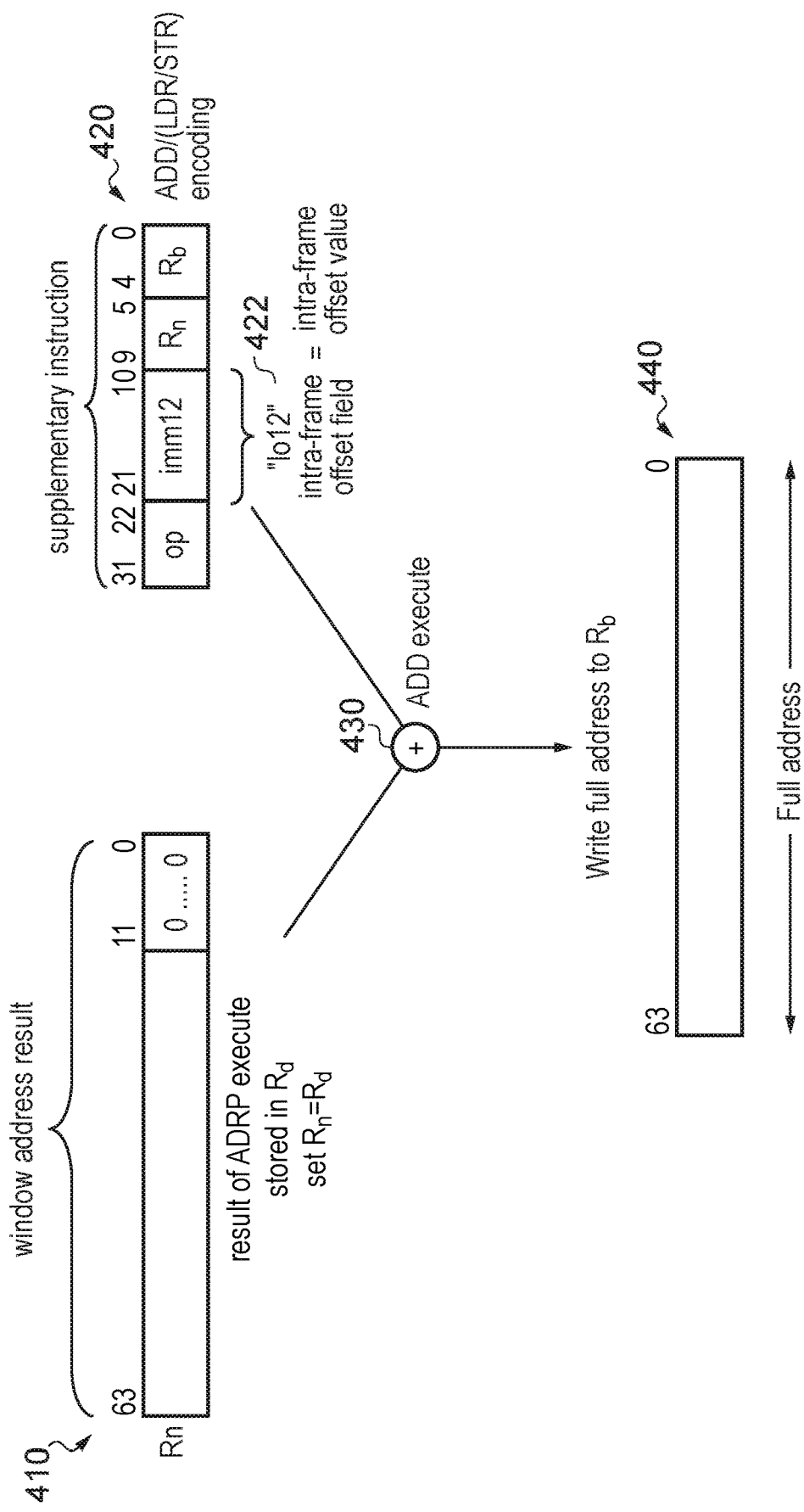
FIG. 4 illustrates an example of how the window address calculated by the address calculating instruction can be used by a supplementary instruction to determine a full address of data or program code to be accessed.

FIG. 3 shows an example of an address calculating instruction which can be used to calculate an address which a subsequent instruction can then use to access data or instructions from memory. The address calculating instruction does not itself trigger a memory access, but causes a calculated address to be stored to a register. This instruction can be particularly useful for enabling the provision of position-independent executables. The program code for a given executable can be allocated to an arbitrary part of the memory address space when provided on a given processing platform. To promote sharing of code between processes, it is desirable that the program code for the executable can be written in such a way that regardless of which part of the address space the code is installed in, references to the data accessed by the code can be the same. This property is known as position-independence, and means it can be useful for addresses to be defined relative to the address of the code itself. While it may be possible for a single instruction to define an offset to be added to the value in the program counter register, and also to trigger a memory access to the resulting address, the number of offset bits available for encoding the offset in the instruction encoding as an immediate value may be limited, (for example as few as 12 bits) which may limit the maximum size of the offset which can be referenced in one instruction relative to the address of the currently executing instruction. To enable more flexible relocation of data components of a given executable, it can be useful to split the address calculation operations into two instructions, first an address calculating instruction as shown in FIG. 3 which generates a window address identifying the address of a certain window of contiguous addresses in the address space, and then secondly a second instruction as shown in FIG. 4 which adds the window address and an immediate offset to generate a full address which can either be used to perform a memory access directly or can be stored to a register for later use. By using the two instructions, the effective offset between the program counter address and the address of the data to be accessed can be larger than if a single instruction was used.

As shown in FIG. 3 the encoding of the address calculating (ADRP) instruction 310 comprises an opcode (op) which identifies the address calculating instruction, a destination register Rd to which the window address calculated in response to the instruction is to be written, and an offset value specified as an immediate value in the instruction encoding. In this example, for reasons of compatibility with legacy instructions, the immediate offset value is actually specified in two separate offset fields, labelled immlo and immhi, where immlo represents the lower two bits of the offset and immhi represents the upper 19 bits of the offset, so that the concatenation of these fields provides a 21-bit offset. It will be appreciated that a different encoding could be used for the offset, e.g. in other examples a single contiguous field could be used to represent the offset.

The functionality of the ADRP instruction 310 is illustrated schematically in FIG. 3. In response to the ADRP instruction being decoded by the decode stage 10, the decode stage 10 generates control signals for controlling the ALU 20 in the execute stage 16 to read the current value in the program counter register 350 (which could be one of the integer registers 50 or could be the program counter pointer portion 72 of the PCC register 68 as discussed above), and to clear the lower portion 362 of the program counter value to 0. In this example the lower portion 362 comprises the lower 12 bits of the program counter value (the number of bits cleared being selected to correspond to the size of the address window). The result of clearing the lower bits of the program counter is that the resulting reference address 360 represents a reference window address which identifies a window of addresses of a given size which comprises the address indicated by the program counter. As the lower portion has 12 bits in this example, for this particular implementation the window size is 4 kB. It will be appreciated that other architectures could choose another window size or may support the window size being configurable using a value specified in the instruction encoding of the ADRP instruction or in one of the control registers 54.

Also in response to the decoding of the ADRP instruction 310, the decode stage 10 controls the execute stage 16 to generate a window offset value 320 based on the offset field 312 of the instruction encoding. The window offset value 320 represents a value to be added to the reference address 360 to shift the reference address by a number of windows corresponding to the value indicated in the offset field 312. Hence, the 21 bits of the offset field 312 are left shifted by 12 bits so that the bits in the lower portion 324 of the window offset value 320 are all 0, and hence the offset value 326 is aligned with the least significant non-cleared bit of the program counter within the reference window address 360. The remaining bit at the most significant end of the window offset value 320 are generated based on a sign extension of the upper bit of the offset value 326.

In response to the ADRP instruction 310, an adder 370 in the ALU 20 adds the reference window address 360 to the window offset value 320 and writes the result of the addition to the destination register Rd. This result represents a partial address result in the sense that it is expected that a further offset will be added to that partial address result in order to generate the actual address of data to be accessed in memory. The result of the ADRP instruction is a window address identifying a selected window within the address space, where a window comprises a contiguous block of addresses of some predetermined size (4 kB in this example) and the selected window is offset from a reference window (identified by the reference address 360) by a number of windows determined based on the offset value specified by the ADRP instruction 310. The reference window refers to the window which comprises the address indicated by the reference address (which in this case is the program counter address 350).

As shown in FIG. 4, a supplementary instruction is provided specifying an immediate field 422 of the same number of bits as the lower portion 362, 324 which was cleared to 0 in the reference window address 360 and window offset value, 320 is added to the window address result 410 previously generated by an ADRP instruction. The supplementary instruction 420 specifies a source register Rn storing the window address result 410. When the supplementary instruction is executed after an earlier ADRP instruction, it would be expected that the register number set for Rn would be set to match the register number set for Rd in the earlier ADRP instruction. In response to the supplementary instruction 410, the resulting full address can either be used to control a memory access or can be written to a register. FIG. 4 shows an example where the supplementary instruction 420 is an add instruction and so the result of adding the immediate offset 422 specified by the supplementary instruction 410 and the window address result 410 is written to the destination register Rb as a full address 420 which can then be used by subsequent instructions to control memory accesses. Alternatively, if a different opcode value op is specified in the supplementary instruction 420, then the instruction may be a load instruction (LDR) or a store instruction (STR) which is a relative-addressed typed of data access instruction which specifies its target address for the load/store operation using relative addressing based on the immediate value 422 specified in the instruction encoding. If the instruction 420 is a load instruction LDR then the decode stage 10 controls the load/store unit 26 to load a data value from the memory address resulting from the addition of the window address result 410 and the immediate offset 422, and stores the loaded value in the destination register Rb. If the instruction 420 is a store instruction then the current value stored in the source register Rb is written to memory at the memory address derived from adding the immediate offset value 422 to the window address results 410 stored in the source register Rn.

Figure 5:
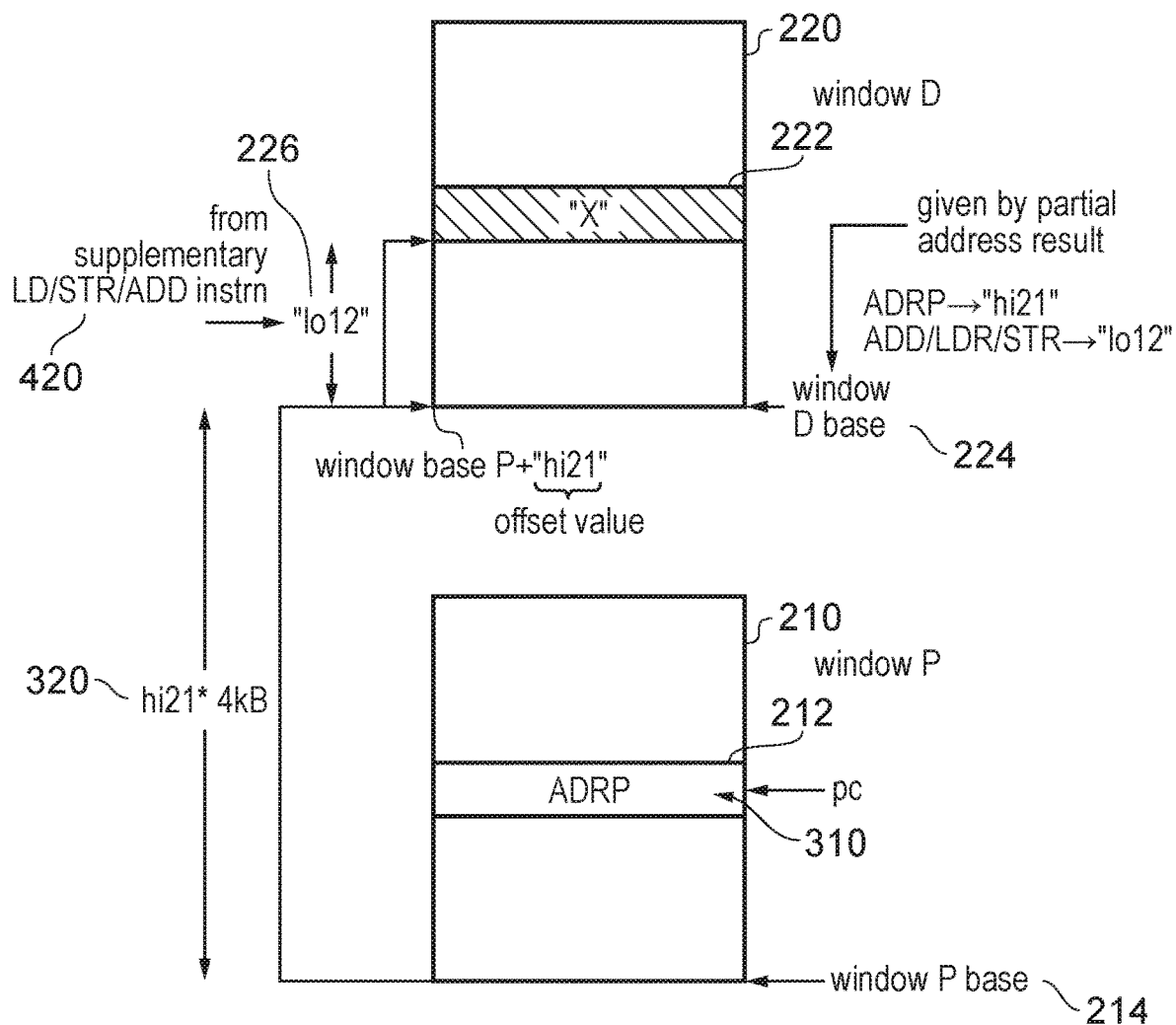
FIG. 5 illustrates respective windows of addresses within an address space that may be referenced using the address calculating instruction and the supplementary instruction.

FIG. 5 schematically illustrates the functionality of the ADRP instruction and the supplementary instruction 420. The ADRP instruction 310 is stored at a certain address 212 in the memory address space, which is within a window of addresses 210 labelled as window P in FIG. 5. The base address of window P is labelled 214. When the ADRP instruction 310 is executed, the window reference address 360 of FIG. 3 corresponds to the window P base address 214 shown in FIG. 5 and the window offset value 320 corresponds to an offset equivalent to multiplying the offset value encoded in the offset fields 312 by a multiple corresponding to the window size (4 kB in this example). Hence, the window address result 410 resulting from the ADRP instruction is the window D base address 224 which marks the start of a window of addresses 220 labelled as window D in FIG. 5.

The address of a certain data value X, labelled 222, which the code within window P wishes to access, is at a certain offset 226 relative to the window D base address 224, and so this offset 226 is specified as the immediate value 422 in the supplementary instruction 420 subsequently executed to access data value X. The same ADRP instruction 310 may be shared among a number of supplementary instructions. For example if there are a number of different data values within window D to be accessed, then a single ADRP instruction may place the window D base address 224 in a register and then a number of different supplementary instructions specifying different values for the offset 226 can be executed to trigger memory accesses for the respective data variables.

This approach means that even if the code is relocated to a different part of the address space, then when the ADRP instruction is encountered within the relocated code the value of the offset fields in the ADRP instruction (which may be fixed at the link time when the relative locations in the memory address space of the respective code and data components are fixed) can be used to access the appropriate data variables without needing to change the underlying program code.

This can be useful for supporting position-independent executables, which may for example be based on a dynamic shared object (DSO) as used in Linux-based systems. In a DSO (FIG. 6), program code 450, read-only (RO) data 452, read-only after dynamic relocation (RELRO) data 454 (data which may need to be updated if the code is relocated, but which is not expected to change while the DSO remains located at a particular part of the address space), data 456 (which may be readable or writable), and zero-initialized data (BSS) 458 are laid out consecutively in increasing address order. The layout is not necessarily contiguous. To support changing virtual-memory (VM) page protection attributes after relocation, RELRO should end at a page (e.g.

4 KiB, 16 KiB, or 64 KiB) address boundary. Usually, that causes a gap between the end of RO data 452 and the start of RELRO data 454. VM pages containing RELRO data 454 are initially writable (to permit dynamic relocation) and are made read-only by the dynamic linker after their relocation.

To support data execution prevention (DEP or W^X for short), which is the principle that a given address should not be accessible with both write permission and execute permission, there should be a VM page boundary between code and RELRO. The minimum size of the DSO is therefore 3 VM pages, with respective permissions RX (for the page comprising the code), RW changing to R upon relocation (for the page comprising RELRO), and RW (for the page comprising Data). Here, R indicates that read permission is granted, RX indicates that read and execute permission is granted, and RW indicates that read and write permission is granted).

To support relocation of the data component independent from the code component, an ADRP instruction within the Code portion can reference data L within a different 4 kB page, where the offset to the page containing "L" is specified in the ADRP instruction—this offset may be fixed by the linker after the relocation.

For the non-capability mode, the ADRP instruction functions as shown in FIG. 3 and there is no need to perform any checks of the constraint metadata associated with capability registers.

If the ADRP instruction is executed in the capability mode, one might expect that instead of referencing the program counter 350 as shown in FIG. 3, the ADRP instructions should simply reference the pointer portion 72 of the PCC register 68 to determine the window address result 410 to be written to the destination register, and the destination register should be a capability register rather than an integer register. However, this view may be too simplistic, as if the program counter register is always referenced as the source providing the reference address for the ADRP instruction in capability mode, then the associated permissions and bounds defined by the metadata 64 of the PCC are mapped across to the result capability comprising the window address 410 generated in response to the ADRP instruction. This would imply that the same set of bounds and permissions should be defined for any relative access triggered using an ADRP instruction in capability mode within a position-independent executable. This may be undesirable, as the permissions which are appropriate for referencing code components 450 or read only data components 452 of a DSO may not be appropriate for the data 456 components of a DSO. For example, it may be desired to enforce that there is no write permission for the region of the address space comprising the code 450 of the executable, and to enforce that there is no execute permission in the region of the address space comprising the executable component's data 456. Also, it may be desirable to be able to support multiple instances of a binaries own data 456, 456' so that a number of instances of running the same code (e.g. two or more instances of running graphics decoding components for decoding images represented in a format such as png) can share the same program instructions located at a single position in memory, even if they need to reference different data.

Figure 6:
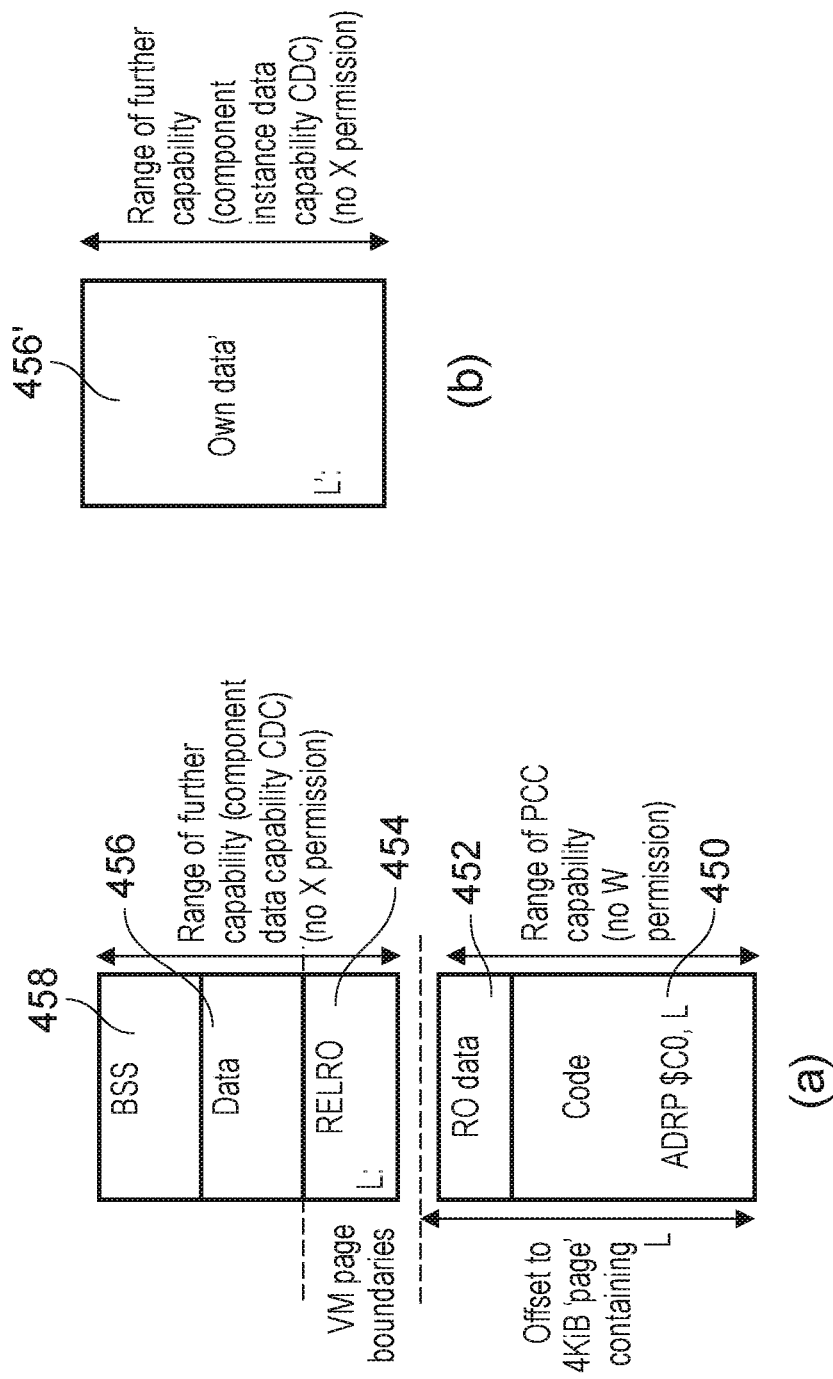
FIG. 6 illustrates an example of use of the address calculating instruction in a position-independent executable.

To support this, when the ADRP instruction is executed in the capability mode, the instruction decoder 10 controls the execute stage 16 to select which capability register is used as a reference capability register to provide the pointer which is used as the reference address 350 while calculating the window address result 410, and the resulting window address result is written to the pointer field of a destination capability register. The reference capability register can be selected to either be the PCC register 68, or to be a component data capability (CDC) which is a further capability register which can be used to describe the binary component's own data 456, 456' for a given position-independent executable. Which capability register is the CDC register can vary from implementation to implementation. For example, the DDC 70 could serve as the CDC selectable as the further capability register for the ADRP instruction. Alternatively, the CDC could be a specified one of the general purpose capability registers 66, for example capability register C29 to choose an arbitrary example. Alternatively, a dedicated system register could be allocated specifically for reference as a further capability register when processing ADRP instructions. Either way, by supporting the flexibility to select different reference capabilities for generating the window address for an ADRP instruction in the capability mode, this means that, as shown in FIG. 6, the data components of an executable can be assigned different access permissions and bounds compared to the code component. Also, different instances of data associated with the same code can be located at different positions in the address space because the offset to L is calculated relative to different values in the further capability register (an earlier instruction may set the reference pointer in the further capability register depending on which data instance 456, 456' is needed).

Figure 7:
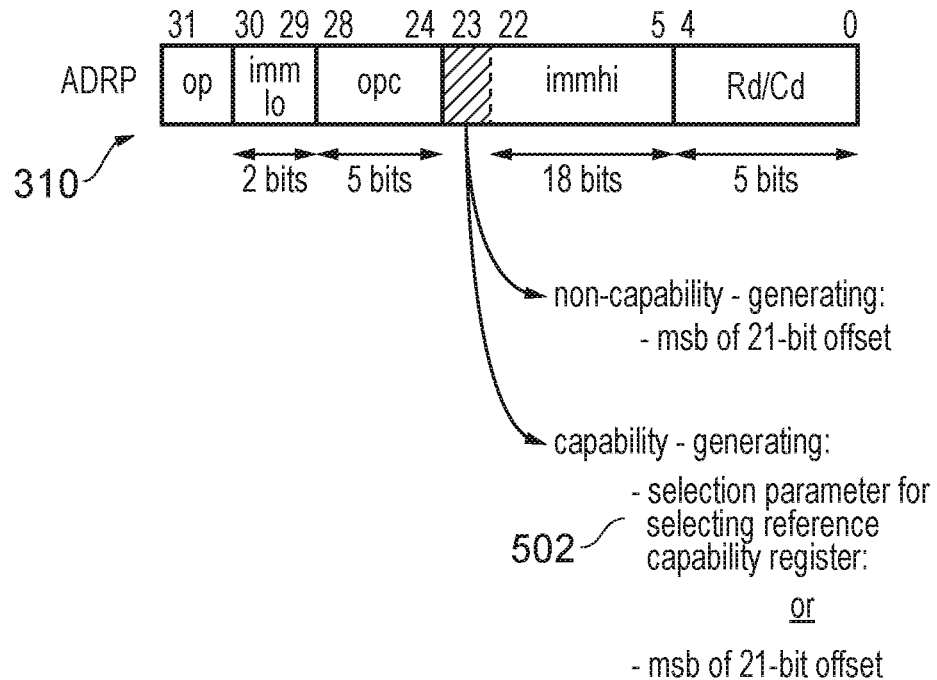
FIG. 7 shows an example encoding of the address calculating instruction in which a parameter in the instruction encoding specifies whether a reference capability register used to determine the window address is a program counter capability register or a further capability register.
Figure 7:
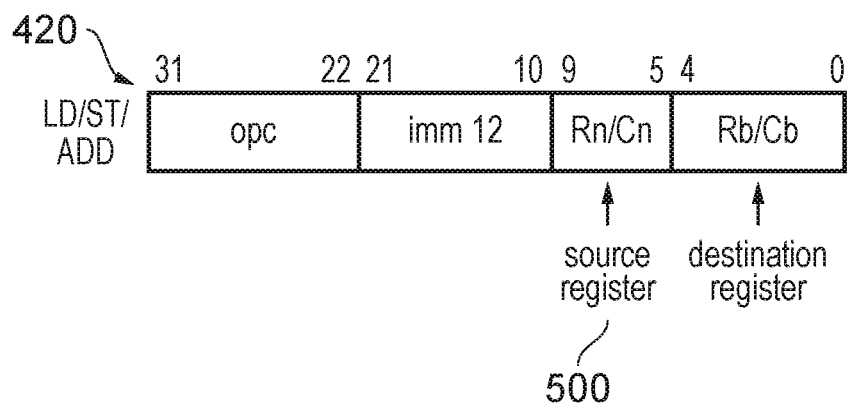

FIG. 7 shows encodings of the ADRP instruction 310 and supplementary instruction 420 in capability and non-capability modes. The encoding of the supplementary instruction 420 is the same as in FIG. 4, and operates in the same way in capability mode as in non-capability mode, except that when in capability mode the source register field 500 is interpreted as referring to a capability register (Cn) instead of to an integer register (Rn). For a load/store instruction, the second register Rb/Cb of the supplementary instruction 420 could be either an integer register or a capability register—for a load instruction it represents the destination register to which data loaded from memory is to be written, and for a store instruction it represents the source register from which data is to be stored to memory. Whether the second register Rb/Cb is an integer register or capability register could be either fixed by design for a particular instruction set architecture, or variable depending on any one or more of: a parameter in the instruction encoding; a control value in a control register; and/or the current sub-mode of operation (in an example where there are a number of sub-variants of capability mode). If the supplementary instruction is an add instruction, then the second register is a destination capability register Cb to store the address result, so that subsequent instructions using the result address to control memory accesses can be policed based on the constraint metadata of the destination register Cb (which may be set to match the constraints in the source register Cn when the supplementary instruction is executed in capability mode).

For the ADRP instruction, the encoding for the capability mode can either be identical to the encoding in non-capability mode, or can have a different encoding specifying an additional selection parameter 502 which controls the selection of which register is the reference capability register. Which approach is used may depend on the particular architectural implementation chosen for a given architecture.

Hence, in some embodiments the selection of whether the reference capability register is the PCC register 68 or the further capability register (CDC register) depends on the selection parameter 502 encoded explicitly in the instruction encoding. To support backwards compatibility with legacy code written for non-capability supporting systems assuming the encoding shown in FIG. 3, it can be useful for the selection parameter to be encoded using bit [23] of the ADRP instruction 210 which represents the most significant offset bit. This is because in practice it has been found that real life code tends not to use the full range of offset values supported by the ADRP instruction so that no instance of existing code in typical executables was found which requires an offset large enough that bit 23 of the ADRP instruction has a different value to bit 22. That is, if the window offset value is not using the full range supported, then it is expected that bits 22 and 23 will have the same numeric value. In practice the difference between the maximum sizes of window offset values found in real code and the range supported by the instruction was found to be 32-64 times smaller than the range supported in the ADRP instruction, so that the number of bits of the offset value which are effectively unused is at least 5 or 6 bits. Hence, the loss of bit 23 for indicating part of the immediate offset can be tolerated without loss of functionality in real code.

Hence, to ensure backwards compatibility so that code written for legacy systems, it can be useful to encode the selection parameter so that if bit 23 is equal to bit 22 then the PCC register 68 is selected as the reference capability register, and if bit 23 has a different bit value to bit 22 then the further (CDC) capability register is selected as the reference capability register. This will tend to ensure that legacy code will operate correctly while newer code written to support the capability functionality can explicitly choose which capability register to reference for generating the window address, so that for example the data components may be referenced using an ADRP instruction which specifies the selection parameter 502 to select the CDC as the reference capability register and the code components may be referenced using and ADRP instruction which has the selection parameter 502 set to select the PCC.

Nevertheless, other embodiments could encode the selection parameter in a different way (e.g. the upper offset bit could indicate PCC with one value (0 or 1) and indicate CDC with the opposite value (0 or 1), regardless of the comparison with the next highest bit).

Alternatively, another architectural approach that could be selected could be that the ADRP instruction has exactly the same encoding regardless of whether it is in non-capability mode or capability mode, and there is no parameter in the instruction which indicates which register is to be used as the reference capability register. In this case, then as in non-capability mode, for the capability mode the upper bit [23] of the offset field still indicates the most significant bit of the 21-bit offset value. With this approach, the selection of which capability register is used as the reference capability register can be based on comparing the program counter-relative address which results from adding the window offset value 320 to the cleared program counter value 360 against the allowable range specified in the bound 74 of the PCC register 68. This may assume that the valid result of the ADRP instruction should either be within the bounds of the PCC or within the bounds of the CDC, and so if it is not within the bounds of the PCC then the window address result 410 of the ADRP instruction should be calculated relative to the CDC instead. This avoids the need for instructions to explicitly encode the selection so that less modification of existing code is needed. However, this may make the processing of the ADRP instruction slower because it may be needed to decompress the bounds 74 in the PCC so that they can be compared with the result of adding the offset to the window address of the window comprising the program counter.

Then, if it is subsequently found that the resulting program counter relative address is not within the bounds of the PCC register then a further operation is needed to adjust the result so that it is generated relative to the CDC instead. While this operation may be relatively slow and imposes a performance cost on processing of the ADRP instruction, in practice as the ADRP may be executed once and then shared between a number of supplementary instructions accessing different variables within the same window of the address space, then this overhead may be amortised across a larger number of memory accesses, so that it may not be a problem. Also, this approach recognises that while a small added performance penalty on a ADRP instruction may be required, it is then not necessary to relocate every data access performed in response to a load/store instruction based on the pointer in a component data capability, which would be another approach for supporting separate relocation of different instances of data components separately from a shared code capability component. Hence, by avoiding the need to relocate each data access based on a component data capability, this can speed up the memory accesses themselves, which may be performed much more frequently than execution of the ADRP instruction, and so the overall performance may be improved.

While FIG. 7 shows an example where the non-capability-generating and capability-generating instructions have the same opcode (op) and a mode indicator 56 indicating whether the current mode is non-capability mode or capability mode distinguishes the non-capability-generating and capability-generating instructions, other examples could use different instruction opcodes, or another field in the instruction encoding, to distinguish the non-capability-generating and capability-generating forms of the instruction.

Figure 8:
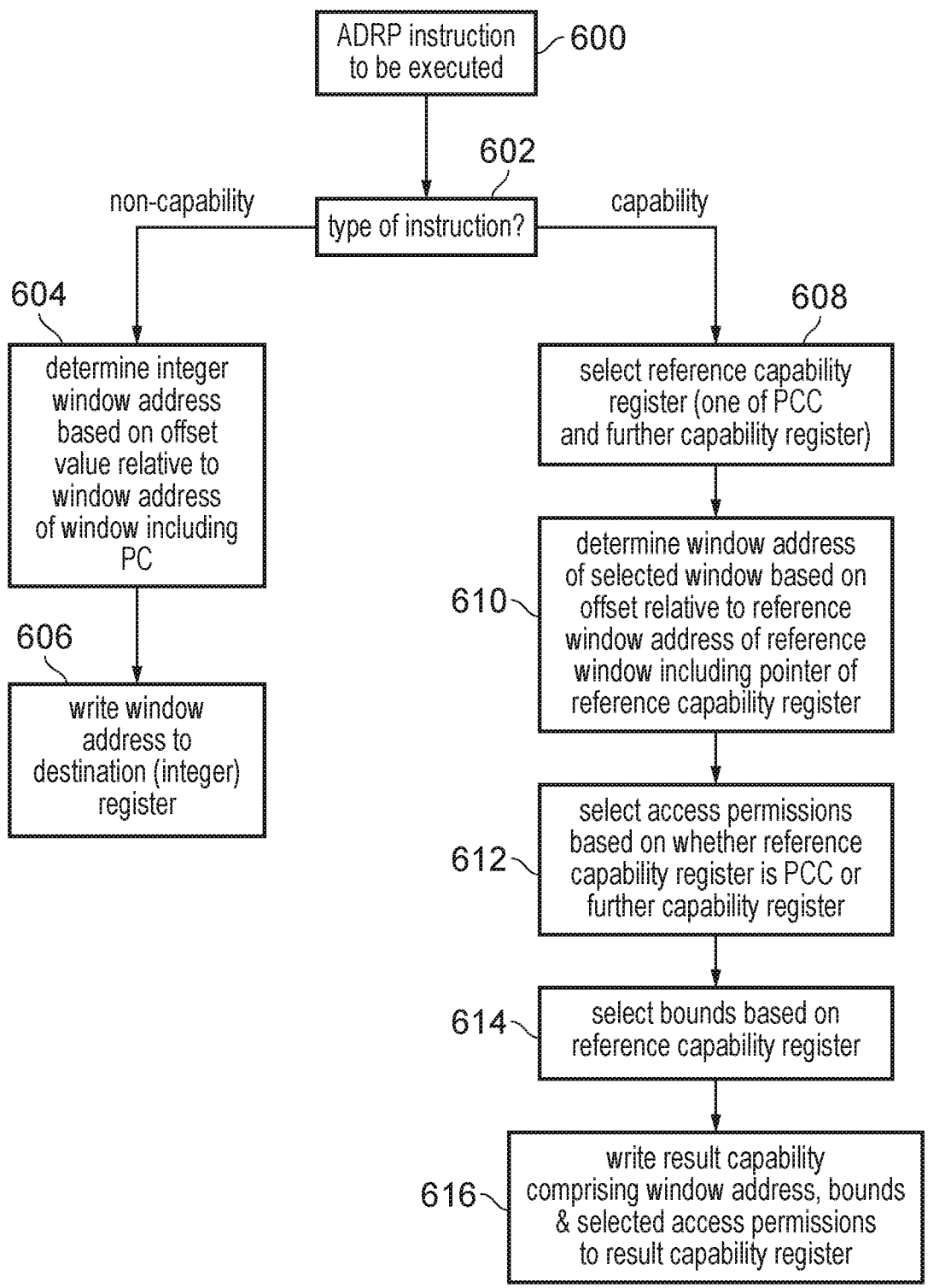
FIG. 8 is a flow diagram showing a method of processing the address calculating instruction.

FIG. 8 schematically illustrates a method of processing an address calculating instruction (ADRP instruction). At step 600 the decode stage 10 identifies that the next instruction to be processed is an ADRP instruction and generates control signals for controlling remaining pipeline stages to perform the corresponding operations. At step 602 it is determined whether the ADRP instruction is a capability-generating or non-capability-generating ADRP instruction (e.g. based on the instruction encoding and/or the current mode of operation). If the instruction is a non-capability-generating ADRP instruction, then at step 604 the control signals control the execute stage 16 to determine an integer window address 410 based on the offset value 312 specified by the ADRP instruction relative to a window address of the window in the address space that includes the program counter value 350. At step 606 the window address is written to a destination register Rd specified by the ADRP instruction 310. The processing at step 604 and step 606 is equivalent to that shown in FIG. 3.

On the other hand, if the instruction is a capability-generating ADRP instruction, then at step 608 the control signals generated in response to the ADRP instruction control the execute stage 16 to select a reference capability register which is either the PCC register 68 or a further capability register (CDC register as discussed above). This selection could either be based on the explicit selection parameter 502 as shown in FIG. 7 or could be based on a comparison of a program-counter-relative address and the allowable range defined in the PCC register 68 as described further in FIG. 9 below.

Figure 9:
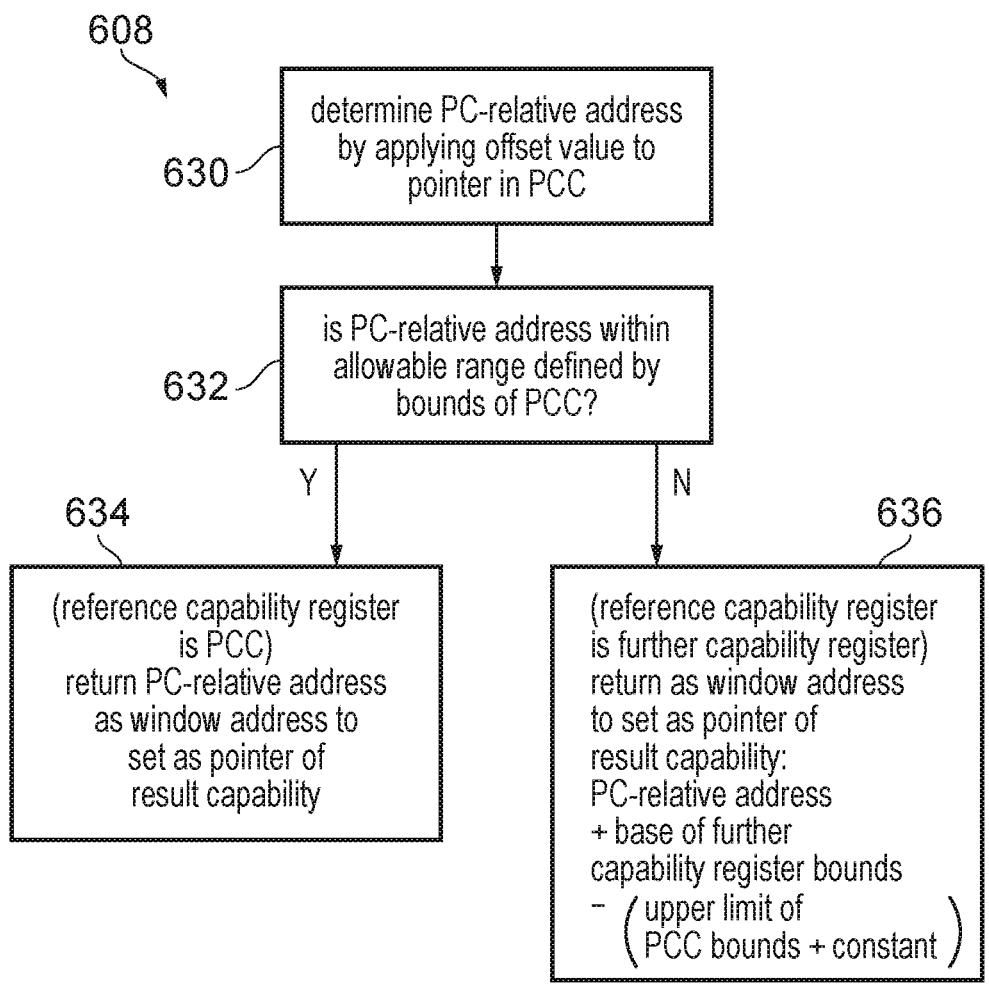
FIG. 9 is a flow diagram showing a method of determining which register is the reference capability register based on whether a program-counter-relative address is within the allowable range specified by constraint metadata of the program counter capability register.

At step 610 the control signals generated by the instruction decoder 10 control the execute stage 16 to determine a window address 410 of a selected window in the address space based on the offset value 312 specified by the ADRP instruction, applied relative to a reference window address of the reference window which includes the pointer within the reference capability register selected at step 608. Note that when the method of FIG. 9 is used at step 608, then in cases where the PCC register 68 is selected as the reference capability register, the window address required at step 610 may already be available and so may not need further calculation beyond the calculations needed to select the reference capability register at step 608. However, in other embodiments some further calculation may be needed after the reference capability register has been selected. Either way, at step 610 some operations are performed which are equivalent to the processing shown in FIG. 3, but applied using the pointer within the reference capability register (PCC or CDC) instead of an integer program counter 350 as shown in the example of FIG. 3.

At step 612, the control signals generated in response to the ADRP instruction also control the execute stage to select a set of access permissions depending on whether the reference capability register is the PCC register 68 or the further capability register (CDC). If the PCC register is the reference capability register then the values for the read/execute permissions are copied from the PCC register to the result capability (so that the result capability specifies the same read/execute permission as the PCC), but regardless of the write permission value specified in the PCC register 68, write permission is not granted for the result capability. This may be more appropriate for references to program code which are more likely when the PCC register 68 is the reference capability register. If a further capability register is selected then the read/write permissions are copied from the further capability register to the result capability, but regardless of the current value for the execute permission in the further capability register, execute permission is not granted for the result capability. This approach avoids simultaneously granting both write and execute permission which can pose a security risk.

While it is possible that in some scenarios this approach may grant excess permissions not desired, such as excess read permission for a region containing code which should not be readable or excess execute permission for read only data accessed within the same address range protected by the PCC 68, these excess permissions can be removed by subsequent instructions if desired. Hence, it may be preferable to simplify the access permission setting at the time of processing an ADRP instruction by not introducing further configuration options for selecting specific access permissions, but to default to selecting read/execute permission when the PCC 68 is the reference capability and read/write permission when the further capability register is selected.

Other implementations could choose to provide other ways of selecting access permissions, which could in some implementations be based on a further selection parameter specified by the ADRP instruction. For example, another bit of the offset field used in non-capability mode could be allocated for indicating which access permissions to select. For example, bit 22 of the encoding shown in FIG. 7 could be used to select between alternative access permissions for each of the options for the reference capability register. For example, for an ADRP instruction which uses the PCC as the reference capability register, the extra selection bit could select between granting both execute and read permission and granting read permission only, while for ADRP instructions which use the further capability register as the reference the extra selection bit could select between whether the granted permissions are read only or both read and write. Again, it is possible to encode this extra selection bit either as a bit value explicitly indicating one of the options using 0 and the other of the options using 1, or alternatively the bit could be encoded so that the information depends on whether the selection bit has the same value as the sign bit of the reduced-sized offset value.

At step 614 of FIG. 8, the bounds for the result capability of the ADRP instruction are selected based on the bounds specified in the reference capability register. The bounds specified in the reference capability register can simply be mapped across to the result bounds unchanged.

At step 616 a result capability is written to the destination capability register specified by the ADRP instruction in capability mode. The result capability comprises as its pointer 62 the window address determined at step 610, as its bounds 74 the bounds selected at step 614 and as its permissions 76 the selected permissions selected at step 612. This result capability can then be referenced by subsequent relative-addressed data access instructions to control accesses to memory, or could be used by a branch instruction to control branching to the pointer specified in the result capability so as to control subsequent instruction fetching from that address. Hence, the permissions assigned at step 612 may govern whether such data access is in the instruction fetches may be successful.

FIG. 9 shows in more detail operations for step 608 for selecting the reference capability register, in an embodiment where the instructions encoding of the ADRP instruction 310 itself does not include the selection parameter 502 shown in FIG. 7. This approach can be used for legacy code written without support for capabilities in mind, or could even be used in newer code in implementations of the architecture which do not provide the selection parameter 502.

At step 630 the control signals generated by the decode stage 10 control the execute stage 16 to determine a program-counter-relative address by applying the offset value 312 of the ADRP instruction to the pointer currently stored in the PCC register 68 (with clearing of lower bits 362 of the pointer as shown in FIG. 3). Hence, this will calculate a window address 224 representing the window of addresses including the current program counter value as shown in FIG. 5. At step 632 the execute stage 16 compares the program counter-relative address generated at step 630 with the allowable range defined by the bounds information 74 in the PCC register 68. If the bounds are stored in compressed form than this may require uncompressing the bounds before comparing them with the address generated at step 630. If the program counter-relative address is within the allowable range of the PCC register then at step 634 the reference capability register is selected as the PCC register 68 and the program-counter-relative address determined at step 630 can be returned as the window address determined at step 610 which is to be set as the pointer of the result capability to be written to the destination capability register in response to the ADRP instruction.

However, if the address determined at step 630 is not within the allowable range defined by the bounds 74 in the PCC register 68, then it can be assumed that it should be calculated relative to the further capability register instead. Therefore, at step 636 the further capability register (CDC) is selected as the reference capability register. Although it would be possible to subsequently obtain the pointer 62 from the further capability register and then repeat the operation shown in FIG. 3 using the offset value from the ADRP instruction, as the program-counter-relative address determined at step 630 has already been aligned to an address window boundary and shifted based on the offset, it can be simpler to generate the window address at step 610 by applying a further shift to the program-counter-relative address based on information from the PCC 68 and the further capability register. In particular, the window address is determined at step 610 according to the formula P+B−U−C, where P is the program-counter-relative address determined at step 630, B is the base address defining the lower limit of the allowable range for the further capability register, U is the upper limit of the allowable range for the PCC 68 and C is a constant which can take any arbitrary value selected for a given architecture implementation. The constant C may for example be 0. A derivation of this expression for calculating the window address in the case when the further capability register is selected is set out below. It will be appreciated that there could be other ways of calculating the window address when the further capability register is selected, depending on the architecture implementation. By converting the program-counter-relative address into the required result of the ADRP instruction, this avoids needing to repeat some of the operations shown in FIG. 3 for clearing lower bits and adding the offset. By enabling a selection between alternative reference capability registers even if the code is written with an instruction that does not explicitly indicate this choice, this enables code and data components of a binary compiled without capabilities in mind to be relocatable in a position-independent manner with different capabilities controlling the valid usage of the code and data components respectively.

Figure 10:
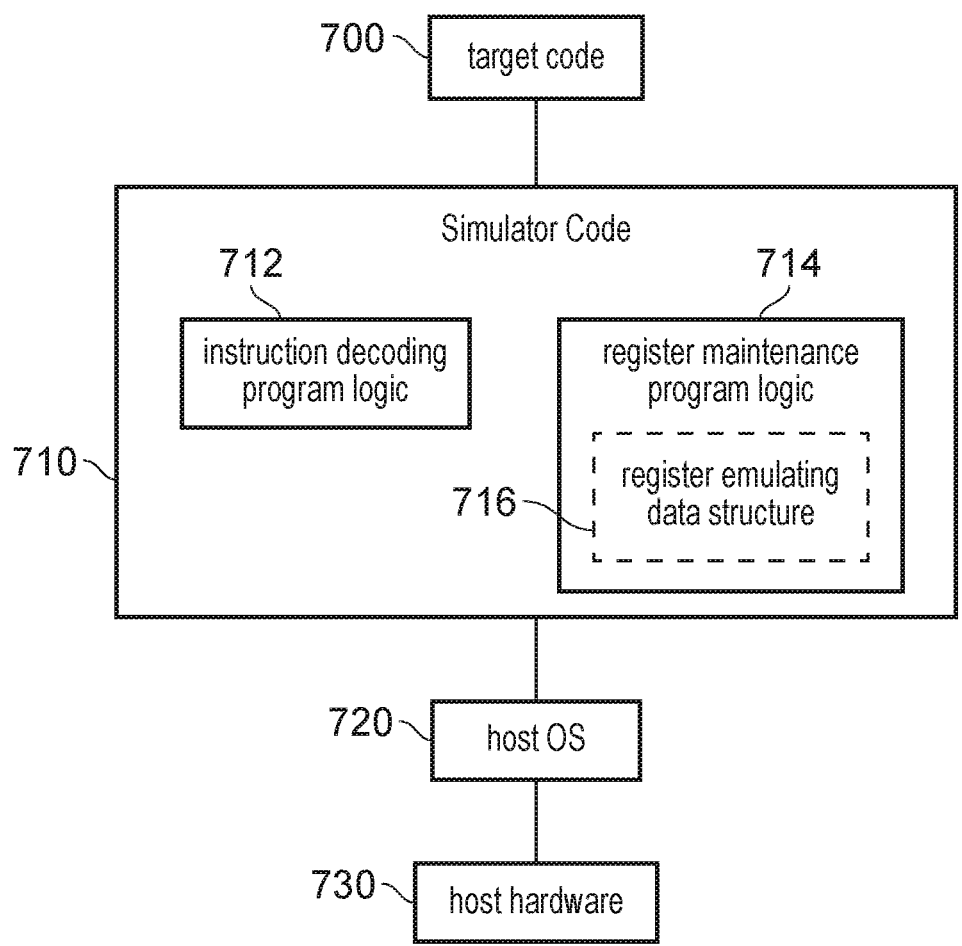
FIG. 10 illustrates a simulator example that may be used.

FIG. 10 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include applications, operating systems and a hypervisor) which is the same as the application program interface of the hardware architecture being modelled by the simulator program 710. Thus, the program instructions of the target code 700, including an ADRP instruction as described above, may be executed from within the instruction execution environment using the simulator program 710, so that a host computer 730 which does not actually have the hardware features of the apparatus 2 discussed above can emulate these features. The simulator code 710 may include instruction decoding program logic 712 which decodes instructions of the target code 700 and maps them to corresponding sets of instructions in the native instruction set of the host processor 730, to emulate functionality of the instruction decoder 10 described above (including implementing the ADRP operation and capability checking described above). The simulator program may also have program logic for controlling whether processing is being performed in capability mode or non-capability mode. Also the simulator program 710 includes register maintenance program logic 714 which maps register references (including references to capability registers) in instructions of the target code to corresponding addresses within a register emulating data structure 716 maintained in the host address space of the host hardware 730 to emulate the architectural registers 14 of the instruction set architecture for which the target code was written.

Appendix—Analysis and Derivations

Given a literal offset fixed at static link-time, ADRP returns the address of the 4 KiB addressing unit (4 KiBAU) containing a target label L (as illustrated in FIGS. 5 and 6). The offset is measured in units of 4 KiB from the base of the 4 KiBAU containing the ADRP instruction. The returned address does not respect the class of data (or code) being addressed. For example, the address returned for an access to read-only data can be an address in code or read-only data.

The range of ADRP is $\pm 2^{20}$ giving a $\pm 2^{32}$ addressing range when combined with the $2^{12}$ range of standard load and store instructions. Note that the largest DSO in the Ubuntu 14.0.3 distribution for AArch64 is about 50 MB, less than $2^{26}$ bytes. The largest executable is less than half that size. Hence, there is a factor of $2^6$ safety margin on ADRP addressing.

An address returned by ADRP is unrestricted in the virtual address space. Code may modify it to point anywhere in the virtual address space that is mapped (or mapped on demand).

In a capability-based world we would like to apply and enforce:

The principle of least privilege (preferably granting only the minimum privilege needed to accomplish a task).

The principle of intentionality. When code accesses (part of) a memory object it should express its intention by citing a capability for that (part of) the memory object.

Access control at arbitrary (byte) granularity, not the granularity of underlying virtual-memory pages (4 KiB, 16 KiB, or 64 KiB).

In the capability-based system described above, it is modal whether an instruction has its legacy behaviour or a new, capability behaviour (that is, a mode indicating value 56 controls whether the instruction is executed in non-capability mode or a capability mode).

In capability mode, ADRP should return a capability, not an integer address, but there are questions to address:

From which capability is the returned capability derived?
What bounds does the returned capability have?
What permissions does the returned capability have?

Note that compilers can generate code to narrow the bounds and reduce the permissions of a capability returned by ADRP, or those of a capability derived from it.

A simple approach to implementing ADRP in capability mode could be that:

The range defined by the bounds 74 of the PCC 68 is set by software to be sufficient to cover the entire position-independent executable (DSO), including code and data.

ADRP returns a capability derived from PCC with the same bounds as PCC.

The returned capability for an ADRP instruction in capability mode has RWX permissions.

Code may subsequently narrow the capability's permissions and/or bounds, or those of a further-derived capability.

However, this approach has the following problems:

Relies on virtual-memory, page-level protections to enforce data execution prevention (W^X) (the principle that a given address cannot be both executable and writable, which can be important to security).

Or, relies on compiled code to narrow permissions appropriately.

Because dynamic linking must manipulate the page-level protections, W^X can, potentially, be broken by an exploit that calls mmap( ) (a Unix system call that maps files or devices into memory).

This solution does not support run-time relocation of references to own data.

Supporting Run-Time Relocation of Own Data

Rationale

To create a second instance of a binary object, it suffices to duplicate the object, but it is only necessary to duplicate its own data (as the code can be shared).

Because the code of binary components is, on average, some 5-7 times larger than their own data, duplicating a whole component is inefficient and raises instruction TLB pressure unnecessarily.

How to do it

In a capability-based world, two capabilities can be used to describe a binary component, so that part of the binary component can be separately or differently addressed from another part:

PCC to describe the component's code and read-only data. (Code and RO-data can be shared by all instances of the component).

A Component Data Capability (CDC) to describe the component's own data, which can be different for each instance.

See FIG. 6 above. CDC could be the default data capability (DDC), or could be another capability as discussed above.

Two options for ADRP could be:
1. Relocate references that are out of the bounds of PCC with respect to CDC (e.g. as shown in FIG. 9).
2. Make ADRP select which capability to use (e.g. as shown with the selection parameter of FIG. 7).

With option 1, an address window boundary (e.g. 4 KiBAU boundary) should be provided below RELO data and above code/RO-data, and a virtual-memory page boundary above RELRO (this is handled in software and is not a feature enforced by the hardware of the processing apparatus).

With option 2, the hardware is simpler, but one bit is removed from ADRP's offset field 312. Some example encodings could use:

The most-significant bit of immhi, bit<23> of the instruction, shifting the sign bit down to bit<22>.

The least significant bit of immlo, bit<29> of the instruction, shifting the whole offset down one bit.

Either way, compilers and linkers would encode the immediate offset a little differently, but the choice makes no difference to them.

For conciseness, we will denote the CDC-relative variant of ADRP by ADRDP (for ad̲d̲r̲e̲s̲s̲ of d̲a̲t̲a̲). It will be appreciated that ADRP and ADRDP are in reality both the same address calculating instruction 310 as described earlier, but are distinguished by the value of the selection parameter encoded in the instruction.

In terms of compatibility with legacy ADRP instructions, moving the sign bit to bit<22> and encoding the other capability (CDC) as bit<23>!=bit<22> requires nothing special to be done in non-capability mode, as in non-capability mode bit<23>=bit<22> unless the span of a component exceeds 2 GB. We know of no such components.

Returned Bounds and Permissions

Simplistically, the bounds of a derived capability can be the bounds of the capability from which it was derived.

In one proposed usage model, the bounds of PCC set by software are expected to be the bounds on the code component (including its RO-data) containing the entry point that resulted in PCC being loaded into the program counter by a branch instruction. Again, this is a feature provided by the software, not architecturally enforced by the hardware.

Separating the addressing of a component's data from its code allows PCC bounds to be narrowed to function scope at the cost of:

Function addresses cannot be constructed by inline code—they would be loaded from RELRO data (for Linux-like systems, from the global offsets table (GOT)).

Read-only data shared between functions should be moved to the RELRO section, perhaps instantiating it multiple times, or duplicated in multiple functions.

Narrowing the scope of PCC is potentially interesting when security concerns eclipse all others.

Under the PCC covers code and RO-data model, the question is raised over what the returned capability's permissions should be. Should it have X, or R, or RX?

If a code address is being constructed, X should be included, but for access to read-only data, R is necessary. This means, for example, that If a component entry-point address is being constructed (that is, the address of a function within the component), and it will ultimately be called or branched to, leading to it becoming the value in PCC, Then the permissions are RX, or the component must be free of RO-data.

There are two solutions:
    Take another bit of ADRP's offset to express the intention of needing a capability with RX rather than R permission, or
    Decide that RX is mostly harmless and let code subsequently narrow the permissions to X (where possible) or R using a further instruction after the ADRP instruction.
This issue interacts with narrowing the bounds of a capability derived from the returned capability. The result of ADRP is not directly usable—there is another step to construct a reference used for data/instruction access.
    Hence, a code generator intending to further derive a capability for a read-only data object should:
    Narrow XR to R, if not already returned with just R.
    Narrow the bounds of the derived capability to those of the data object.
If the derived capability refers to a component entry point, a problem remains. The addressing architecture relies on the whole singly instantiated part of a component being readable and executable, even though that is incorrect and insecure. There are some alternative fixes for this.
    Rely on the virtual-memory page protections by putting a page boundary between code (RX or X) and RO-data (R).
    Introduce a third base capability (in addition to PCC and CDC.
    Move small RO-data to the RELRO section and address large RO-data via the GOT (in the RELRO section).
The third fix allows security-sensitive code to execute with only X permission (no R or W) and guarantees that correct code cannot repurpose RO-data as gadget code.
    For less sensitive code, we might be prepared to argue that we will rely on correct code generation anyway, so why not rely on it to avoid generating executable capabilities for RO-data? Code would ensure that the pointer field of any executable capability derived from the result of ADRP must point within the component's code.
    If, for example, a compiler can prove that the returned capability does not escape the current function, and does not reach any local gadget sequence, there is no insecurity in running with relaxed bounds and more permission than needed, at least through subsequent derivations for which the ADRP might generate a common sub-expression (CSE).
    For example, in deriving a capability for a read-only data object to pass out of this function, the compiler should generate code to:
    Remove X permission from the derived capability.
    Tighten the bounds of the derived capability to the bounds of the data object.
Only the compiler can generate code to tighten bounds—object bounds have no meaning to hardware, and the compiler should either generate code to remove X permission or generate an ADRP expressing the intention that it needs R permission, not RX permission.
    Moving permission narrowing into ADRP feels like a good decision from an implementation perspective since narrowing permissions costs one gate delay versus costing an addition instruction. In general, there will be few cases in which a result of ADRP would be a CSE for a derived executable capability and a derived RO-data capability. As already observed, only the code generator can properly narrow bounds.
ADRDP Result Derived from CDC
    There are similar concerns when a capability is derived by ADRDP from CDC. The result should have read permission (R) and/or write permission (W).

Subsequent direct use (by loads and stores) should respect bounds and permissions (we rely on the code generator to ensure that code using literal offsets does this).
    A subsequent derivation to construct a capability for a data object should appropriately narrow bounds and reduce permissions. Leaving an RW capability for part of the RELRO section would be insecure.
    Again, we could rely on code generators to generate code to narrow permissions, but it could be more intentional to express in the ADRDP instruction whether the capability should be for RELRO or writable data. Hence, some implementations may prefer to provide a further selection parameter for selecting whether the capability access permissions should be R or RW.
    Bounds can only be narrowed by generated code using additional instructions.
Summary of One Possible Implementation of ADRP:
In capability mode, ADR[D]P generates a capability result as follows.
    The range of ADR[D]P is reduced to $2^{31}$ (from $2^{32}$).
        The sign bit for the immediate moves to bit<20> of the current immediate.
        Bit<21> selects whether to derive from PCC (ADRP) or CDC (ADRDP).
Optionally, the sign bit could be moved to bit<19> and the immediate range reduced to $2^{30}$.
    Bit<20> then selects:
        (For ADRP deriving from PCC) XR versus R.
        (For ADRDP deriving from CDC) WR versus R.
In both cases, selection can be encoded as bit<N>=0/1 or as bit<N>!=sign bit. However, this is not the only possible implementation. The analysis below has shown that in practice the additional selection parameter for selecting the access permissions is not essential.
Security-Oriented Analysis
    As noted in the preceding sections, it is in general desirable for ADR[D]P to return a capability with:
    {R,X} permissions when addressing the code and read-only data segment relative to PCC.
    {R,W} permissions when addressing the RELRO and writable data segment relative to CDC.
{R,X} permissions cause two threats:
    (Confidentiality) Secrets embedded in code can be read.
    (Integrity) Code (accidentally) embedded in read-only data can be executed.
{R,W} permissions cause a single threat:
    (Integrity) Data that should be read-only after dynamic relocation (RELRO) can be written.
Excess Read Permission
    The ability to read code arises because the program-counter capability (PCC) has {R,X} permissions. It has these because code needs to read its read-only data and there is only one register addressing this segment in a position-independent way.
    There are some simple code-generation mitigations for this issue that do not cause application binary interface (ABI) incompatibility.
    Small, read-only data objects can be constructed by code or moved into the RELRO segment.
    Large, read-only data objects can be addressed indirectly via the global object table (GOT) in the RELO segment. They remain in the ELF segment that is instantiated only once.
This allows the limit of the executable capability describing this segment to be reduced to the end of code, R to be removed from its permissions, and an execute-only value in PCC.

Excess Execute Permission

Permission to execute (read-only) data arises because the program-counter capability (PCC) necessarily has {R,X} permissions but just one address range. In this case, code can remove X permission from a capability it constructs for a read-only data object.

A capability returned by ADRP may be used in the following ways, all of which might apply to the same value.

A 12-bit, signed, immediate constant can be added to the address to construct an executable capability. {RX} permission is appropriate if PCC has {RX} permission (see section above). The address is a code address by construction (assuming code-generator correctness).

A 12-bit, signed, immediate constant can be added to the address to construct a data capability. {R} permission is appropriate. {X} permission must be removed. The address is a data address by construction (assuming code-generator correctness).

The capability may be used as the base capability for a load or store instruction with a 12-bit literal offset. {R} permission is necessary; {X} permission is ignored.

The capability returned by ADRP may be a common sub-expression (CSE) for any/all of these cases. CSE is, in effect, a copy of PCC with an adjusted pointer field.

From a security perspective, it suffices to:

Make any function capability derived from CSE immutable (a sealed entry capability).

Remove {X} permission from any data capability derived from CSE.

Remove {X} from, or invalidate, the CSE capability before its value escapes the "local safe context".

How shall we define "local safe context"?

Given that control reaches the ADRP instruction which returns CSE, the requirement is:

There is no code path from the ADRP along which CSE may escape the function, even in the face of an adversary powerful enough to control all mutable data values.

Values derived from CSE are made immutable or have {X} permission removed as described in the first two bullets above, before they reach any flowgraph point at which they may escape the function.

May escape is a standard data-flow analysis for compilers. From a security perspective, may escape includes being left in the register file at a function call or return and being spilled to an accessible portion of the stack before a function call or return, as well as being address-taken. Flowgraph reachability must include all paths, including so-called wrong paths, as these support speculation-based attacks. Paradoxically, this simplifies data-flow analysis.

Excess Write Permission

The capability returned by ADRDP (ADRP relative to CDC) may be a common sub-expression (CSE) for either or both of a data object in:

The RELRO section (so the derived capability should not have {W} permission).

The writable data section (so the derived capability may have {W} permission).

A code generator may generate code to remove {W} permission from a derived capability for a data object that is read-only at the language level, notwithstanding that it is stored in the component's mutable data section.

From a security perspective, it suffices that generated code correctly narrows the bounds and permissions of derived capabilities before they escape the local safe context defined in the preceding section, and narrows to {R} the permissions of, or invalidates, CSE itself before it can escape.

A heavier handed but more secure solution mimics that for removing excess read permission.

Mutable data is addressed only via the (immutable) global object table (GOT).

This allows the bounds of CDC to be reduced to those of the RELRO segment and its permissions to be reduced to {R}.

Any capability derived from CDC by ADRDP then has no {W} permission. Obtaining a capability for writable data involves loading it from the GOT.

Summary

There are viable options for generating secure code which create binary components that are call-compatible with components built less securely (with more reliance on correct code generation). Stronger security guarantees (e.g. against slightly faulty code generation) need not cause ABI incompatibility.

Integration with Legacy Code

ADRP instructions in legacy code cannot explicitly indicate which reference capability to use (PCC or CDC). In this section, we explore the implications of such relocation on the behaviour of legacy binary components that conform to the layout depicted in part (a) of FIG. 6.

ADRP PCC-relative works straightforwardly because there is only ever one instance of code+RO data. A PCC-relative address can be computed and PCC.base subtracted from it if (and only if) PCC-relative relocation will subsequently be applied in this execution mode.

DDC-Relative Relocation

Let us now derive an approach to handling ADRP given the goals to be achieved: data references made DDC-relative, potentially allowing multiple instances of a component's data without the component's knowledge or consent.

Let a binary component in which control resides be described by the pair of capabilities PCC and $DDC^n$ for n=0, 1, 2 ... indexing possible multiple instances of its data.

Conceptually, ADRP first computes a program-counter-relative capability C, which is a copy of PCC with PCC.pointer adjusted by a literal amount fixed at static link time (the literal amount is the offset value set by the linker for the ADRP instruction, C.pointer effectively corresponds to the window address which would result from the ADRP instruction if the PCC was used as the reference capability). C.pointer does not need to lie within the bounds of PCC. If it does not, it should lie within the bounds of DDC.

Let $DDC^0$ be the value of DDC assumed at static link time. For position-independent entities, $DDC^0$ is such that $DDC^0.base - PCC.base =$ static link-time offset, $O^0$. If that invariant does not hold, it is meaningless to address the range of $DDC^0$ PC-relative. This invariant holds for any component in which code addresses the range of $DDC^0$ PC-relative. Note that this is correct by construction (by tools that run no later than static-link time).

Assuming we are dealing with byte-precise addresses, relocation by DDC proceeds as follows:

First Compute C.pointer

If C.pointer in [$DDC^0$.base, $DDC^0$.limit), add DDC.base−$DDC^0$.base to C.pointer. For convenience, denote [X.base, X.limit) by X.range.

Now, we don't know the values of DDC.base or $DDC^0$.base but we do know ($DDC^0$.base−PCC.base)=$O^0$ (a link-time constant). That yields:

If C.pointer in $DDC^0$.range, add (DDC.base−PCC.base−$O^0$) to C.pointer.

We now need a proxy for C.pointer in $DDC^0$.range and a way to materialize $O^0$.

We know, by construction, C.pointer in PCC.range OR C.pointer in $DDC^0$.range. Using the usual set-theoretic notation for intersection and difference on ranges viewed as sets, re-write this as:

C.pointer in (PCC.range−$DDC^0$.range)|C.pointer in (PCC.range∩$DDC^0$.range)|C.pointer in ($DDC^0$.range−PCC.range)

The three clauses apply to non-intersecting subranges so only one clause can be true.

Now, the only condition we can reliably evaluate at execution time is C.pointer in PCC.range and we require not (C.pointer in PCC.range)⇒C.pointer in $DDC^0$.range but:

not (C.pointer in PCC.range)=
not (C.pointer in (PCC.range−DDC0.range)|C.pointer in (PCC.range & $DDC^0$.range))=
not not (C.pointer in (PCC.range−DDC0.range) & not C.pointer in (PCC.range & $DDC^0$.range)

So not (C.pointer in PCC.range)⇒
not (C.pointer in (PCC.range & $DDC^0$.range)) and C.pointer in (PCC.range & $DDC^0$.range).

This is satisfied only if (PCC.range & $DDC^0$.range)={ }, that is the ranges do not overlap.

Requiring (PCC.range & $DDC^0$.range)={ } yields:

If C.pointer not in PCC.range, add (DDC.base−PCC.base−$O^0$) to C.pointer

That leaves the value of $O^0$ to deal with. We could put it in yet another ambient register, or we could fix it architecturally. Because we require PCC.range to be disjoint from $DDC^0$.range and, by hypothesis (part (a) of FIG. 6) PCC.limit≤$DDC^0$.base, so:

$DDC^0$.base=PCC.limit+architectural constant (this constant is referred to as C in FIG. 9 above).

In practice, architectural constant might as well be zero. Consequently, $O^0$=($DDC^0$.base−PCC.base)=(PCC.limit−PCC.base), finally yielding:

If C.pointer not in PCC.range, add (DDC.base−PCC.limit) to C.pointer.

That choice fixes how we describe legacy, position-independent binary components with PCC and DDC, at least conceptually as far as static link time. At run time, we are free to place DDC anywhere that DDC.range does not overlap PCC.range.

4 KiB Address Units

In the preceding section, our analysis assumed byte-precise addresses. In the case of ADRP we are not. There is an up to 4 KiB uncertainty between the pointer returned by ADRP and where the eventual access will be made.

The simplest proof that this does not affect the validity of the proofs in the preceding section replays the arguments in units of 4 KiB, leading to these additional validity requirements:

No 4 KiB 'page' of PCC.range overlaps any 4 KiB 'page' of $DDC^0$.range.
($DDC^0$.base & 0xfff)=0.
(PCC.limit+0xfff) & ~0xfff=$DDC^0$.base.

That is, when measured in 4 KiB chunks, PCC.range abuts DCC0.range and does not overlap it. This condition cannot be violated by legacy binary components for Linux, as there is always a 64 KiB address boundary above code+RO and below RELRO+data+bss. This is to accommodate one binary, independent of the host's choice of page size and to avoid requiring that RO data always follows code.

Address Relocation

There remains the question of what address displacement to apply in non-capability mode to C.pointer at its point of use (in cases where the ADRP result is returned as a relative address relative to the base address of the PCC/DDC reference capability). E.g.:

PCC.base if C.pointer in PCC.range; DDC.base otherwise. That would work for code addresses (add PCC.base at point of use) and stores (add DDC.base at point of use) but loads are problematic. Which base should be added to a load address?

The answer to this conundrum is to return the offset relative to PCC.base. That requires range checking of the relocated address as follows.

On control transfers, the address is checked against PCC.range.
Store addresses are checked against DDC.range.
Load addresses are checked against both ranges; access to either is permitted.

ADRP Summary Definition for One Embodiment:

If C.pointer in PCC.range, ADRP returns C.pointer−PCC.base

If C.pointer not in PCC.range, ADRP returns C.pointer−PCC.limit+DDC.base−PCC.base At point of use, PCC.base is added to the address.

For a single-instance component, PCC.limit−DDC.base so the expression collapses to C.pointer−PCC.base.

Encapsulating a Legacy Program or System

Thus far, our solution supports instantiating a legacy binary component under these constraints:

For each instance, PCC.range and DDC.range do not overlap.
PCC.range includes all code.
DDC.range includes all data including stack and heap.

This solution allows one binary component to be encapsulated in a compartment. PCC naturally changes as control passes between compartments, but this model only works if DDC is also changed. Any call into or out of such a compartment becomes a compartment call rather than a function call.

The restriction that PCC.range includes all code and does not overlap DDC.range precludes encapsulating a system (or program) comprising multiple binary components and, hence, rules out this ADRP behaviour in legacy non-capability mode. Hence, to accommodate legacy non-capability code we:

should permit arbitrary interleaving of code and own data.
Need not require multiple instantiation of own data.
Would like to be able to relocate the whole system in the address space.

Let's now re-examine the arguments of the preceding sections under this new constraint.

Relocation and Range Checking

Instruction fetches are relocated relative to PCC.base and checked against PCC.range. Logically, data accesses should be relocated relative to DDC.base and checked against DDC.range. However, a legacy program expects code-address X to access the same location as data address X. In most execution environments, code may expect to be able to access all low addresses down to 0 but does not rely on the upper limit of the address space because this is usually controlled by the execution environment. These requirements constrain PCC and DDC for legacy programs as follows.

PCC.base=DDC.base.
PCC.range includes all the code.
DDC.range includes all the data (and, most likely, all the code too).

However, these conditions are not uniquely determined. It is equally viable to:

Relocate all accesses by PCC.base.
Check all accesses against PCC.range.
Ignore DDC.

PCC changes naturally on control transfers so this solution supports:

Capability-based function calls into a compartment containing a legacy non-capability system.

Function calls out of the compartment via a shim resembling a conventional PLT+PLTGOT.

It does not change the memory safety of the non-capability system itself, though it provides isolation between such a system and capability-based compartments interacting with it.

ADRP in Whole-Program Context

ADRP in non-capability mode returns a PC-relative address and this is what it should continue to do in capability mode except that the address must be relative to PCC.base, in common with the single-component solution summarized in ADRP summary definition, above.

Security Oriented Observations

There is one case in which checking data access against DDC appears to give better memory safety than checking them against PCC. We have already observed in the preceding section that PCC.base=DDC.base. However, if PCC.limit<DDC.limit the range [PCC.limit, DDC.limit) permits data accesses but does not permit execution.

In practice W^X (aka DEP) already prevents such access in the underlying virtual-memory (VM) system. Legacy binaries are built with full awareness of VM page boundaries and protections so we can dismiss this case as having no memory-safety value. There is no need to check data accesses against DDC.

ADRP Options

Hence, pulling the threads above together:

To encapsulate and relocate a whole program or system, ADRP returns a PC-relative address, relative to PCC.base. DDC should be ignored.

To encapsulate a single, position-independent binary component and either
relocate its own data independently of its code
multiply instantiate its own data:
the behaviour specified in ADRP summary definition is provided as discussed above.

To support, this a system can be provided with four modes of ADRP behaviour:

1. The behaviour is as in FIG. 3 for non-capability mode and accesses are not range-checked against PCC or DDC.
2. ADRP returns a PC-relative address relative to PCC.base.
   All memory accesses are checked against PCC.range.
   PCC.base is added to each memory access address at its point of use.
3. In this mode:
   Instruction fetches are checked against PCC.range.
   Data accesses are checked against PCC.range and DDC.range; fault if both checks fail.
   If ADRP refers to PCC.range, return PC-relative address (C.pointer as discussed above).
   Otherwise return PC-relative address+DDC.base−PC-C.limit−Constant (although constant may be zero for some architecture implementations).
4. As option 3, but replace PC-relative address by PC-relative address−PCC.base and add PCC.base to all memory access addresses at their point of use.

It will be appreciated that the analysis above describes some specific implementations and other implementations are possible.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   processing circuitry hardware to perform data processing;
   instruction decoder hardware to decode instructions to control the processing circuitry hardware to perform the data processing; and
   a plurality of capability registers including a result capability register, each capability register to store a capability comprising a pointer and constraint metadata for constraining valid use of the pointer or the capability, the capability registers including a program counter capability register for which the pointer represents a program counter address indicative of a current point of program flow; in which:
   in response to a capability-generating address calculating instruction specifying an offset value the instruction decoder hardware is configured to control the processing circuitry hardware to:
   select a reference capability register as one of the program counter capability register and a further capability register; and
   write to the result capability register a result capability for which the pointer of the result capability indicates a window address identifying a selected window within an address space, where a window comprises a contiguous block of addresses of a predetermined size, the selected window is offset from a reference window by a number of windows determined based on the offset value specified by the capability-generating address calculating instruction, and the reference window comprises the window which comprises an address indicated by the pointer of the reference capability register.

2. The apparatus according to claim 1, in which the processing circuitry hardware has a capability mode and a non-capability mode, and
   the capability-generating address calculating instruction comprises an address calculating instruction processed by the processing circuitry hardware in the capability mode.

3. The apparatus according to claim 1, in which the instruction decoder hardware is configured to control the processing circuitry hardware to select whether the reference capability register is the program counter capability register or the further capability register based on a selection parameter specified by an instruction encoding of the capability-generating address calculating instruction.

4. The apparatus according to claim 3, in which:
the processing circuitry hardware has a capability mode and a non-capability mode,
the capability-generating address calculating instruction comprises an address calculating instruction processed by the processing circuitry hardware in the capability mode or the non-capability mode;
in response to the address calculating instruction processed by the processing circuitry hardware in the non-capability mode, the instruction decoder hardware is configured to control the processing circuitry hardware to write to a destination register an integer window address determined based on the offset value relative to a window address of a window including a non-capability program counter address; and
for the address calculating instruction processed by the processing circuitry hardware in the capability mode, the selection parameter is encoded using a bit of an instruction encoding of the address calculating instruction which, in the non-capability mode, represents a most significant bit of the offset value.

5. The apparatus according to claim 1, in which the constraint metadata specifies an allowable range for the pointer; and
in response to the capability-generating address calculating instruction, the instruction decoder hardware is configured to control the processing circuitry hardware to:
select the program counter capability register as the reference capability register when a program-counter-relative address is within the allowable range specified by the constraint metadata of the program counter capability register, the program-counter-relative address corresponding to a result of applying the offset value to the pointer stored in the program counter capability register; and
select the further capability register as the reference capability register when the program-counter-relative address is outside the allowable range specified by the constraint metadata of the program counter capability register.

6. The apparatus according to claim 5, wherein
the plurality of capability registers includes the further capability register; and
in response to the capability-generating address calculating instruction, the instruction decoder hardware is configured to control the processing circuitry hardware to:
determine the program-counter-relative address;
compare the program-counter-relative address with the allowable range specified by the constraint metadata of the program counter capability register;
when the program-counter-relative address is within the allowable range specified by the constraint metadata of the program counter capability register, return the program-counter-relative address as the pointer of the result capability; and
when the program-counter-relative address is outside the allowable range specified by the constraint metadata of the program counter capability register, return as the pointer of the result capability a pointer corresponding to P+B−U−C, where P is the program-counter-relative address, B is a base address of the allowable range specified by the constraint metadata of the further capability register, U is an upper limit address of the allowable range specified by the constraint metadata of the program counter capability register, and C is a constant value.

7. The apparatus according to claim 1, wherein
the plurality of capability registers includes the further capability register; and
in response to at least one type of capability-controlled data access instruction the instruction decoder hardware is configured to control the processing circuitry hardware to trigger signalling of a fault when a target address determined based on at least one parameter of the capability-controlled data access instruction is outside both:
an allowable range indicated by the constraint metadata of the program counter capability register; and
an allowable range indicated by the constraint metadata of the further capability register.

8. The apparatus according to claim 1, wherein
the plurality of capability registers includes a target-address capability register; and
in response to a relative-addressed capability-controlled data access instruction specifying the target-address capability register and an intra-window offset value, the instruction decoder hardware is configured to perform a data access to a target address determined based on adding the intra-window offset value to the pointer stored in the target-address capability register.

9. The apparatus according to claim 1, in which the constraint metadata specifies access permissions for use of the pointer of the capability, the access permissions specifying at least one of:
a read permission value indicating whether a read permission is granted to provide permission to use the capability for controlling a read data access;
a write permission value indicating whether a write permission is granted to provide permission to use the capability for controlling a write data access; and
an execute permission value indicating whether an execute permission is granted to provide permission to use the capability for determining a branch target address or for controlling fetching of an instruction for execution.

10. The apparatus according to claim 9, in which, in response to the capability-generating address calculating instruction, the instruction decoder hardware is configured to set the access permissions specified in the constraint metadata of the result capability to indicate different access permissions depending on whether the reference capability register is the program counter capability register or the further capability register.

11. The apparatus according to claim 9, wherein
the plurality of capability registers includes the further capability register; and
in response to the capability-generating address calculating instruction:
when the reference capability register is the program counter capability register, the processing circuitry hardware is configured to copy the read permission value and the execute permission value specified in the constraint metadata of the program counter capability to the constraint metadata of the result capability, and to set the write permission value for the result capability to indicate that write permission is not granted; and
when the reference capability register is the further capability register, the processing circuitry hardware is configured to copy the read permission value and the write permission value specified in the constraint metadata of the further capability register to the constraint metadata of the result capability, and to set the execute permission value for the result capability to indicate that execute permission is not granted.

12. The apparatus according to claim 9, in which the capability registers comprise a default data capability register to store a default data capability for constraining use of pointers represented using non-capability operands.

13. The apparatus according to claim 12, in which in response to at least one type of capability-controlled data access instruction the instruction decoder hardware is configured to control the processing circuitry hardware to perform a data access to a target address determined based on at least one capability operand of the capability-controlled data access instruction, without relocating said target address based on the default data capability stored in the default data capability register.

14. The apparatus according to claim 12, in which the further capability register is the default data capability register.

15. The apparatus according to claim 1, in which the plurality of capability registers comprise a plurality of general purpose capability registers accessible by capability-specifying instructions in at least one configuration of the processing circuitry hardware; and
the further capability register is a predetermined one of the general purpose capability registers.

16. The apparatus according to claim 1, in which the window address is an absolute address identifying the selected window.

17. The apparatus according to claim 1, wherein
the plurality of capability registers includes a target capability register;
the constraint metadata specifies an allowable range for the pointer;
the window address is a relative address identifying the selected window relative to a base address of the allowable range specified by the constraint metadata of the program counter capability register; and
in response to a relative-addressed capability-controlled data access instruction specifying the target capability register and an intra-window offset value, the instruction decoder hardware is configured to control the processing circuitry hardware to perform a data access to a target address determined based on adding the intra-window offset value and the base address of the allowable range specified by the constraint metadata of the program counter capability register to the pointer stored in the target capability register.

18. A data processing method for an apparatus comprising processing circuitry hardware and a plurality of capability registers including a result capability register, each capability register to store a capability comprising a pointer and constraint metadata for constraining valid use of the pointer or the capability, the capability registers including a program counter capability register for which the pointer represents a program counter address indicative of a current point of program flow;
the data processing method comprising:
in response to a capability-generating address calculating instruction specifying an offset value, controlling the processing circuitry hardware to:
select a reference capability register as one of the program counter capability register and a further capability register; and
write to the result capability register a result capability for which the pointer of the result capability indicates a window address identifying a selected window within an address space, where a window comprises a contiguous block of addresses of a predetermined size, the selected window is offset from a reference window by a number of windows determined based on the offset value specified by the capability-generating address calculating instruction, and the reference window comprises the window which comprises an address indicated by the pointer of the reference capability register.

19. A non-transitory computer-readable storage medium comprising a computer program to control a host data processing apparatus to provide an instruction execution environment for execution of target code, the computer program comprising:
instruction decoding program logic to decode instructions of the target code to control the host data processing apparatus to perform data processing; and
register maintenance program logic to maintain a data structure representing a plurality of capability registers including a result capability register, each capability register to store a capability comprising a pointer and constraint metadata for constraining valid use of the pointer or the capability, the capability registers including a program counter capability register for which the pointer represents a program counter address indicative of a current point of program flow; in which:
in response to a capability-generating address calculating instruction specifying an offset value, the instruction decoding program logic is configured to control the host data processing apparatus to:
select a reference capability register as one of the program counter capability register and a further capability register; and
write to the result capability register a result capability for which the pointer of the result capability indicates a window address identifying a selected window within an address space, where a window comprises a contiguous block of addresses of a predetermined size, the selected window is offset from a reference window by a number of windows determined based on the offset value specified by the capability-generating address calculating instruction, and the reference window comprises the window which comprises an address indicated by the pointer of the reference capability register.

* * * * *